US011471855B2

(12) United States Patent
Shimizu et al.

(10) Patent No.: US 11,471,855 B2
(45) Date of Patent: *Oct. 18, 2022

(54) ADSORPTION METHOD FOR AT LEAST ONE OF CESIUM AND STRONTIUM EMPLOYING SILICOTITANATE HAVING SITINAKITE STRUCTURE

(71) Applicants: TOSOH CORPORATION, Yamaguchi (JP); EBARA CORPORATION, Tokyo (JP)

(72) Inventors: Yoju Shimizu, Yamaguchi (JP); Hajime Funakoshi, Yamaguchi (JP); Keisuke Tokunaga, Yamaguchi (JP); Shigeru Hirano, Yamaguchi (JP); Takashi Sakuma, Tokyo (JP); Makoto Komatsu, Tokyo (JP); Takeshi Izumi, Tokyo (JP)

(73) Assignee: TOSOH CORPORATION, Yamaguchi (JP)

( * ) Notice: Subject to any disclaimer, the term of this patent is extended or adjusted under 35 U.S.C. 154(b) by 841 days.

This patent is subject to a terminal disclaimer.

(21) Appl. No.: 16/239,177

(22) Filed: Jan. 3, 2019

(65) Prior Publication Data

US 2019/0134599 A1    May 9, 2019

Related U.S. Application Data

(63) Continuation of application No. 15/322,918, filed as application No. PCT/JP2015/070555 on Jul. 17, 2015, now Pat. No. 10,343,136.

(30) Foreign Application Priority Data

Jul. 18, 2014 (JP) ................................. 2014-147677
Feb. 27, 2015 (JP) ................................. 2015-039326
(Continued)

(51) Int. Cl.
*B01J 20/10* (2006.01)
*C01B 33/20* (2006.01)
(Continued)

(52) U.S. Cl.
CPC ........... *B01J 20/10* (2013.01); *B01J 20/0214* (2013.01); *B01J 20/28011* (2013.01);
(Continued)

(58) Field of Classification Search
USPC ....................................................... 210/688
See application file for complete search history.

(56) References Cited

U.S. PATENT DOCUMENTS 5,208,006 A    5/1993  Kuznicki et al.
6,068,682 A    5/2000  Kuznicki et al.
(Continued)

FOREIGN PATENT DOCUMENTS

JP    2000-15001     1/2000
JP    2001-526172   12/2001
(Continued)

OTHER PUBLICATIONS

Celestian et al., "In situ Raman spectroscopic study of transient polyhedral distortions during cesium ion exchange into sitinakite," *American Mineralogist*, vol. 98; 2013; pp. 1153-1161.
(Continued)

*Primary Examiner* — Hayden Brewster
(74) *Attorney, Agent, or Firm* — Greenblum & Bernstein, P.L.C.

(57) ABSTRACT

The present invention provides a composition that includes a silicotitanate that has a sitinakite structure, the composition having higher cesium adsorptivity than conventional compositions. The present invention also provides a production method for the composition that includes a silicotitanate that has a sitinakite structure. The production
(Continued)

method does not require the use of hazardous or deleterious materials, can generate a product using a compound that is easily acquired, and can use a general-purpose autoclave. Also provided is a silicotitanate composition that has higher strontium adsorptivity than the present invention. Provided is a silicotitanate composition that contains niobium and a silicotitanate that has a sitinakite structure, the composition having at least two or more diffraction peaks selected from the group consisting of $2\theta=8.8°\pm0.5°$, $2\theta=10.0°\pm0.5°$, and $2\theta=29.6°\pm0.5°$.

6 Claims, 12 Drawing Sheets

(30) Foreign Application Priority Data

May 11, 2015 (JP) ................................. 2015-096690
May 11, 2015 (JP) ................................. 2015-096691

(51) Int. Cl.
| G21F 9/12 | (2006.01) |
| B01J 20/02 | (2006.01) |
| B01J 20/28 | (2006.01) |
| C02F 1/28 | (2006.01) |
| B01J 20/30 | (2006.01) |
| C02F 101/10 | (2006.01) |
| C02F 103/06 | (2006.01) |
| C02F 103/08 | (2006.01) |

(52) U.S. Cl.
CPC ..... B01J 20/28016 (2013.01); B01J 20/3007 (2013.01); C01B 33/20 (2013.01); C02F 1/281 (2013.01); G21F 9/12 (2013.01); *C02F 2101/10* (2013.01); *C02F 2103/06* (2013.01); *C02F 2103/08* (2013.01)

(56) References Cited

U.S. PATENT DOCUMENTS

| 6,110,378 A | 8/2000 | Anthony et al. |
| 6,479,427 B1 | 11/2002 | Anthony et al. |
| 2015/0343436 A1* | 12/2015 | Choi ........................ B01J 39/02 210/502.1 |

FOREIGN PATENT DOCUMENTS

| JP | 3840506 | 11/2006 |
| JP | 4919528 | 4/2012 |
| JP | 2013-88391 | 5/2013 |
| JP | 5696244 | 4/2015 |
| WO | 94/19277 | 9/1994 |

OTHER PUBLICATIONS

Chitra et al., "Optimization of Nb-substitution and $Cs^+/Sr^{+2}$ in crystalline silicotitanates (CST)," *J. Radioanal Nucl. Chem.*; 2013; pp. 607-613.

Chitra et al., "Uptake of cesium and strontium by crystalline silicotitanates from radioactive wastes," *J. Radioanal Nucl. Chem.*; 2011; pp. 955-960.

International Search Report issued in Patent Application No. PCT/JP2015/07055, dated Oct. 20, 2015.

International Preliminary Report on Patentability issued in Patent Application No. PCT/JP2015/070555, dated Feb. 2, 2017.

\* cited by examiner

ADSORPTION METHOD FOR AT LEAST ONE OF CESIUM AND STRONTIUM EMPLOYING SILICOTITANATE HAVING SITINAKITE STRUCTURE

The present application is a Continuation of U.S. application Ser. No. 15/322,918, which is a National stage of International Patent Application No. PCT/JP2015/070555 filed Jul. 17, 2015, which claims priority to Japanese Application No. 2015-096690 filed May 11, 2015, Japanese Application No. 2015-096691 filed May 11, 2015, Japanese Application No. 2015-039326 filed Feb. 27, 2015, and Japanese Application No. 2014-147677 filed Jul. 18, 2014. The disclosures of U.S. application Ser. No. 15/322,918; PCT/JP2015/070555; as well as Japanese Application No. 2015-096690 filed May 11, 2015, Japanese Application No. 2015-096691 filed May 11, 2015, Japanese Application No. 2015-039326 filed Feb. 27, 2015, and Japanese Application No. 2014-147677 filed Jul. 18, 2014 are incorporated by reference as though set forth in full herein.

TECHNICAL FIELD

The present invention relates to a composition including a silicotitanate having a sitinakite structure and a production method for the same. The composition including a silicotitanate of the present invention is useful in applications such as treatments of harmful ions in contaminated water, seawater, or groundwater.

BACKGROUND ART

As an adsorbent capable of removing harmful ions from an aqueous solution, a silicotitanate has been known.

For example, Patent Literature 1 discloses a silicotitanate as an ion exchanger for removal of a radioactive substance in seawater and a production method for the same.

Patent Literature 1 discloses a silicotitanate containing niobium.

A raw material for the silicotitanate of Patent Literature 1 includes an organic alkoxy compound. Specifically, the raw material in Patent Literature 1 includes tetraethyl orthosilicate as a silica source, tetraisopropyl orthotitanate as a titanium source, and tetrapropylammonium bromide and tetrabutylammonium bromide as a structure directing agent. The silica source, the titanium source, and the structure directing agent are difficult to be obtained, and correspond to hazardous or deleterious materials. Therefore, vapor generated from them at high temperatures may cause explosion. Accordingly, the production method of Patent Literature 1 requires a reaction at low temperatures. However, the reaction rate is decreased at low temperatures and productivity declines, which is not preferred.

Patent Literature 2 discloses a method for producing a titanosilicate-type zeolite that is a separating agent capable of separating a gas or liquid mixture. However, a silica source, a titanium source, and a structure directing agent in Patent Literature 2 are tetraalkyl orthosilicate, tetrabutyl orthotitanate, and tetrapropylammonium hydroxide, respectively, which correspond to hazardous or deleterious materials. Vapor generated from these compounds and a mixture thereof at high temperatures causes a reaction tube to corrode. Therefore, use of a special production device such as stainless pressure-resistant reaction tube equipped with a Teflon (registered trademark) inner tube is required.

Patent Literature 3 discloses a crystalline silicotitanate CST-2 as an adsorbent for an aqueous solution including only cesium.

Patent Literature 4 discloses silicotitanic acid as an adsorbent for an aqueous solution including cesium and strontium.

Patent Literature 5 discloses an adsorbent for cesium or strontium including a crystalline silicotitanate that is different from a sitinakite structure and titanate.

CITATION LIST

Patent Literature

Patent Literature 1: U.S. Pat. No. 6,110,378
Patent Literature 2: JP3840506
Patent Literature 3: JP4919528
Patent Literature 4: JP2013-088391
Patent Literature 5: JP5696244

SUMMARY OF INVENTION

Technical Problem

The present invention provides a composition including a silicotitanate having a sitinakite structure, the composition having higher cesium adsorptivity than that of a conventional cesium adsorbent, and especially, a composition including a silicotitanate having high adsorptivity in a medium to be treated containing a small amount of cesium (hereinafter also represented by "Cs") and high selective adsorptivity in a medium to be treated containing a large amount of metal ions other than Cs, and a method for producing the composition including a silicotitanate having a sitinakite structure that does not require use of hazardous or deleterious materials, can achieve production using a compound that is easily acquired, and can use a general-purpose autoclave.

The present invention further provides a composition including a silicotitanate having higher strontium adsorptivity than that of a conventional strontium adsorbent, and especially, a silicotitanate that has high adsorptivity in a medium to be treated containing a small amount of strontium (hereinafter also represented by "Sr") and high selective adsorptivity in a medium to be treated containing a large amount of metal ions other than Sr, and a production method for the same.

Solution to Problem

The present inventors have found a composition including a silicotitanate in which a compound that is not a hazardous or deleterious material can be used as a raw material, and a production method for the composition. Thus, the present invention has been completed.

Specifically, the present invention provides the following [1] to [14].

[1] A silicotitanate composition including a silicotitanate having a sitinakite structure and niobium,
wherein the composition has at least two or more diffraction peaks at X-ray diffraction angles selected from the group consisting of $2\theta=8.8\pm0.5°$, $2\theta=10.0\pm0.5°$, and $2\theta=29.6\pm0.5°$.

[2] The composition according to [1] described above, wherein the composition has at least X-ray diffraction angles $2\theta$ and X-ray diffraction peak intensity ratios that are shown in Table 1 below.

TABLE 1

| X-RAY DIFFRACTION ANGLE 2θ [°] | XRD PEAK INTENSITY RATIO |
|---|---|
| 8.8 ± 0.5 | 5 OR MORE AND 20 OR LESS |
| 10.0 ± 0.5 | 5 OR MORE AND 20 OR LESS |
| 11.3 ± 0.5 | 100 |
| 29.6 ± 0.5 | 5 OR MORE AND 40 OR LESS |

[3] The silicotitanate composition according to [1] or [2] described above, wherein the composition includes a crystalline substance having at least two or more diffraction peaks at X-ray diffraction angles selected from the group consisting of 2θ=8.8±0.5°, 2θ=10.0±0.5°, and 2θ=29.6±0.5°.

[4] The silicotitanate composition according to [3] described above, wherein the crystalline substance is a niobate.

[5] A production method for the composition according to any one of [1] to [4] described above, including a crystallization step of crystallizing a silicotitanate gel having the following mole ratios:

Si/Ti mole ratio: 0.5 or more and 2.0 or less,
$H_2O$/Ti mole ratio: more than 100 and 150 or less,
M/Ti mole ratio: 1.0 or more and 5.0 or less, and
Nb/Ti mole ratio: 0.36 or more and 0.65 or less or Si/Ti mole ratio: 0.5 or more and 2.0 or less,
$H_2O$/Ti mole ratio: 20 or more and 150 or less,
M/Ti mole ratio: 1.0 or more and 5.0 or less, and
Nb/Ti mole ratio: more than 0.65 and 1.5 or less.

[6] An adsorbent for at least cesium or strontium, the adsorbent including the silicotitanate composition according to any one of [1] to [4] described above.

[7] An adsorption method for at least cesium or strontium including using the silicotitanate composition according to any one of [1] to [4] described above.

[8] A silicotitanate composition that includes a silicotitanate having a sitinakite structure and niobium and has diffraction peaks at X-ray diffraction angles of at least 2θ=27.8±0.5° and 2θ=29.4±0.5°.

[9] The silicotitanate composition according to [8] described above, having at least X-ray diffraction angles 2θ and XRD peak intensity ratios that are shown in Table 2 below.

TABLE 2

| X-RAY DIFFRACTION ANGLE 2θ [°] | XRD PEAK INTENSITY RATIO |
|---|---|
| 11.3 ± 0.5 | 100 |
| 27.8 ± 0.5 | 30 OR MORE AND 70 OR LESS |
| 29.4 ± 0.5 | 30 OR MORE AND 70 OR LESS |

[10] The silicotitanate composition according to [8] or [9] described above, including a crystalline substance having diffraction peaks at X-ray diffraction angles of at least 2θ=27.8±0.5° and 2θ=29.4±0.5°.

[11] The silicotitanate composition according to [10] described above, wherein the crystalline substance is a silicotitanate having a vinogradovite structure.

[12] A production method for the silicotitanate composition according to any one of [8] to [11] described above, including a crystallization step of crystallizing a silicotitanate gel having the following mole ratios:

Si/Ti mole ratio: 0.5 or more and 2.0 or less,
$H_2O$/Ti mole ratio: 20 or more and 100 or less,
M/Ti mole ratio: 1.0 or more and 5.0 or less, and
Nb/Ti mole ratio: 0.36 or more and 0.65 or less.

[13] An adsorbent for at least cesium or strontium, the adsorbent including the silicotitanate composition according to any one of [8] to [11] described above.

[14] An adsorption method for at least cesium or strontium including using the silicotitanate composition according to any one of [8] to [11] described above.

Hereinafter, a production method for a composition including a silicotitanate having a sitinakite structure (hereinafter also referred to as "silicotitanate composition") of the present invention will be described.

The production method for a silicotitanate composition of the present invention (hereinafter also referred to as "production method of the present invention") is a method for producing a composition including a silicotitanate having a sitinakite structure, the method including a gelation step of mixing an inorganic titanium compound, an inorganic silicon compound, water, and an alkali metal hydroxide to obtain a silicotitanate gel, and a crystallization step of crystallizing the silicotitanate gel.

In the gelation step, an inorganic titanium compound, an inorganic silicon compound, water, and an alkali metal hydroxide are mixed to obtain an amorphous silicotitanate gel.

In the gelation step, the inorganic titanium compound and the inorganic silicon compound are used as a titanium source and a silicon source, respectively. The titanium source and the silicon source are not included in hazardous or deleterious materials, including an organic alkoxy metal compound. The inorganic titanium compound and the inorganic silicon compound are soluble in an aqueous solution of alkali metal hydroxide. Even when the inorganic titanium compound and the inorganic silicon compound are mixed, an organic substance such as alcohol is pot generated. Therefore, the titanium source and the silicon source are easily handled as compared with an organic alkoxy metal compound such as an organic alkoxy titanium compound and an organic alkoxy silicon compound. Since they are inexpensive, an inorganic titanium salt and the inorganic silicon compound are suitable for industrial use.

The inorganic titanium compound may be at least one kind of the group consisting of titanium sulfate, titanium oxysulfate, sodium metatitanate, and titanium chloride. As the more preferred inorganic titanium compound, may be mentioned at least any of titanium sulfate and titanium oxysulfate, and further preferably titanium oxysulfate.

The inorganic silicon compound may be at least one compound selected from the group consisting of sodium silicate, silica sol, fumed silica, and white carbon. The inorganic silicon compound is preferably at least any of sodium silicate and silica sol, and more preferably sodium silicate since they are comparatively easily dissolved in an aqueous solution of alkaline metal hydroxide.

The alkali metal hydroxide may be at least one compound selected the group consisting of lithium hydroxide, sodium hydroxide, and potassium hydroxide. The alkali metal hydroxide is preferably at least any of sodium hydroxide and potassium hydroxide, and more preferably sodium hydroxide since they are inexpensive.

When the respective raw materials are made into aqueous solutions, water may be moisture contents contained in the aqueous solutions, or water may be mixed separately from the respective raw materials.

In the gelation step, the inorganic titanium compound, the inorganic silicon compound, water, and the alkali metal hydroxide are mixed to obtain the amorphous silicotitanate gel (hereinafter sometimes simply referred to as "silicotitanate gel"). It is preferable that the inorganic titanium compound, the inorganic silicon compound, water, and the alkali metal hydroxide be mixed at the following mixing mole ratios:

Si/Ti mole ratio: 0.5 or more and 2.0 or less,
$H_2O$/Ti mole ratio: 20 or more and 150 or less, and
M/Ti mole ratio: 1.0 or more and 5.0 or less.
(M is at least one alkali metal selected from the group consisting of Li, Na, and K, and is preferably Na.)

The mixing mole ratios are more preferably the following ratios:

Si/Ti mole ratio: 1.0 or more and 2.0 or less,
$H_2O$/Ti mole ratio: 20 or more and 150 or less, and
M/Ti mole ratio: 1.0 or more and 5.0 or less.
(M is at least one alkali metal selected from the group consisting of Li, Na, and K, and is preferably Na.)

The Si/Ti mole ratio may be 0.5 or more and 2.0 or less, preferably 0.8 or more and 1.7 or less, and more preferably 1.0 or more and 1.5 or less. When the Si/Ti mole ratio is 0.5 or more and 2.0 or less, the silicotitanate composition is efficiently obtained.

The $H_2O$/Ti mole ratio is preferably 20 or more and 150 or less, and more preferably 40 or more and 100 or less. When the $H_2O$/Ti mole ratio is 20 or more, the viscosity of silicotitanate gel obtained is decreased. Thus, the silicotitanate gel is likely to be stirred. When the $H_2O$/Ti mole ratio is 150 or less, the yield of the silicotitanate composition tends to be increased.

The M/Ti mole ratio is preferably 1.0 or more and 5.0 or less, more preferably 1.5 or more and 4.5 or less, and further preferably 2.5 or more and 4.5 or less. When the M/Ti mole ratio is 1.0 or more and 5.0 or less, the silicotitanate composition is efficiently obtained.

It is preferable that the silicotitanate gel include at least one kind (hereinafter referred to as "doped metal") selected from the group consisting of niobium, tantalum, vanadium, antimony, manganese, copper, and iron. When the silicotitanate composition is obtained from the silicotitanate gel including the doped metal, the Cs and Sr adsorption properties are further enhanced. In order to further enhance the Cs and Sr adsorption properties of the obtained silicotitanate composition, it is particularly preferable that the doped metal is niobium.

The silicotitanate gel including the doped metal may be obtained by at least any of a method of mixing the inorganic titanium compound, the inorganic silicon compound, water, the alkali metal hydroxide, and a source of the doped metal and a method of adding the doped metal source to the silicotitanate gel.

It is preferable that the doped metal source be at least one selected from the group consisting of a metal, an alloy, and a compound that they include the doped metal. The compound including the doped metal may be at least one selected from the group consisting of a hydroxide, a chloride, a nitrate, and a sulfate that they include the doped metal. In order to further enhance the Cs adsorption properties of the silicotitanate composition, the doped metal source is preferably the compound including the doped metal, more preferably at least any of the hydroxide and the nitrate that include the doped metal, and further preferably the hydroxide including the doped metal.

It is preferable that the doped metal included in the silicotitanate gel have a mole ratio of the doped metal to titanium (hereinafter also referred to as "$M_{dope}$/Ti mole ratio") of 0.01 to 1.5. When the $M_{dope}$/Ti mole ratio falls within this range, production of a byproduct that does not contribute to adsorption of Cs and Sr is reduced, and the Cs and Sr adsorption properties are enhanced.

It is preferable that a seed crystal be mixed in the silicotitanate gel. When the seed crystal is mixed in the silicotitanate gel, the silicotitanate gel is crystallized in a shorter time. The seed crystal may be a crystalline silicotitanate.

For example, the seed crystal may be a silicotitanate having a sitinakite structure. The amount of the seed crystal relative to the silicotitanate gel is 0.5% by weight or more and 10% by weight or less, and preferably 0.5% by weight or more and 5% by weight or less.

When the silicotitanate gel is crystallized, the silicotitanate composition is obtained.

In the crystallization step, the silicotitanate gel obtained by mixing the inorganic titanium compound, the inorganic silicon compound, water, and the alkali metal hydroxide is crystallized. In the production method of the present invention, the silicon source and the titanium source that do not correspond to hazardous or deleterious materials are used, but a structure directing agent is not used. The structure directing agent is generally an expensive compound. According to the production method of the present invention using no structure directing agent, the silicotitanate composition can be produced at lower cost.

The crystallization temperature may be 150° C. or higher and 230° C. or lower, preferably 160° C. or higher and 220° C. or lower, and more preferably 170° C. or higher and 200° C. or lower. When the crystallization temperature is 150° C. or higher, the crystallinity of the obtained silicotitanate tends to be enhanced. A crystallization temperature of 230° C. or lower is a temperature sufficient to use a general-purpose reaction vessel or the like.

The crystallization time may be 24 hours or more and 120 hours or less. When the crystallization time is 24 hours or more, the crystallinity of the silicotitanate included in the obtained silicotitanate composition tends to be enhanced. In contrast, when it is 120 hours or less, the silicotitanate composition having sufficient Cs or Sr adsorption properties is obtained.

In the crystallization step of the production method of the present invention, the silicotitanate composition can be obtained by crystallizing the silicotitanate gel. The production method of the present invention may further include any one or more of steps of cooling the silicotitanate composition that is a crystallized product obtained in the crystallization step, filtrating the composition, washing the composition, and drying the composition.

When the crystallized silicotitanate composition is cooled, a cooling condition is not particularly limited. Examples of the condition may include cooling the composition in a heating furnace at 10° C./min and forced cooling or natural cooling the composition taken, out from the heating furnace.

When the crystallized silicotitanate composition is filtered, an optional filtration method may be adopted. Examples of the filtration method may include a filtration method using Nustche and a filtration method using a filter such as a belt filter. In the method using a filter or the like, a filter having an opening with about 1 μm is preferably used as the filter.

When the crystallized silicotitanate composition is washed, pure water in an amount of 5 to 10 times the weight of the silicotitanate composition can be used as washing water. Hot water obtained by heating the pure water to 60° C. to 90° C. is further preferably used as washing water. A washing method by mixing this washing water with the silicotitanate composition may be adopted.

When the crystallized silicotitanate composition is dried, drying of the silicotitanate composition in the air at 50° C. or higher and 120° C. or lower, preferably 70° C. or higher and 90° C. or lower may be adopted. When the silicotitanate composition after drying is aggregated, the silicotitanate composition may be appropriately pulverized by a mortar, a pulverizer, or the like.

After crystallization, the silicotitanate composition can be powdered through the above-described steps.

The silicotitanate composition obtained by the production method of the present invention includes a silicotitanate having a sitinakite structure, and the Cs adsorption amount is large. The Sr adsorption amount and Cs adsorption amount of the silicotitanate composition in the coexistence of seawater component are large, and the silicotitanate composition has an effect of selectively adsorbing Sr.

The silicotitanate having a sitinakite structure (hereinafter also referred to as "S-type silicotitanate") is a crystalline silicotitanate having an XRD peak that is identified by a powder X-ray diffraction (hereinafter referred to as "XRD") described in any of E. V. Sokolova, et al., Sov. Phys. Dokl. 34, 583 (1989) (hereinafter referred to as "Reference Document 1"), M. J. Buerger, et al., W. A. DollAse, Z. KRISTAL-LOGR., 125, 92 (1967) (hereinafter referred to as "Reference Document 2"), and sitinakite of American Mineralogist Crystal Structure Database (http://ruff.geo.arizona.edu./AMS/amcsd.php, search date: Jul. 1, 2014, referred to as "Reference HP").

In the silicotitanate composition of the present invention, a mole ratio of silicon to titanium is preferably 0.2 or more and 1.5 or less, more preferably 0.5 or more and 1.0 or less, and further preferably 0.6 or more and 0.8 or less.

In the silicotitanate composition of the present invention, a mole ratio of alkali metal to titanium is preferably 0.5 or more and 4.0 or less, more preferably 1.0 or more and 2.1 or less, and further preferably 1.0 or more and 1.7 or less.

The silicotitanate composition of the present invention preferably includes at least one metal (hereinafter referred to as "doped metal") selected from the group consisting of niobium, tantalum, vanadium, antimony, manganese, copper, and iron, and more preferably includes niobium. When the doped metal is included, the Cs adsorptivity of the silicotitanate composition is improved.

The doped metal included in the silicotitanate composition of the present invention preferably has a mole ratio of the doped metal to Ti of 0.01 to 1.5, and more preferably 0.01 to 1.2. When the mole ratio of the doped metal to Ti ($M_{dope}$/Ti mole ratio) falls within this range, the Cs adsorptivity is improved. The range of the mole ratio is preferably 0.2 or more and 1.2 or less.

The silicotitanate composition of the present invention preferably has an average particle diameter of 4.0 μm or more and 20 μm or less, and more preferably 8.0 μm or more and 20 μm or less.

In a cumulative curve of particle diameter distribution of the silicotitanate composition of the present invention, the cumulative value at which the particle diameter is 10 μm is preferably 90% or less, and more preferably 60% or less.

Herein, an "average particle diameter" of the silicotitanate composition represents the diameter of a sphere of which the volume is the same as that of particle of which the cumulative curve of particle diameter distribution expressed on the basis of volume is a median value (median diameter: particle diameter corresponding to 50% of the cumulative curve). The average particle diameter can be measured using a particle diameter distribution measurement device by a laser diffraction method.

The particle diameter of the silicotitanate composition of the present invention may be 0.5 μm or more and 150 μm or less. The volume frequency of each particle diameter tends to be relatively uniform. Therefore, the particle diameter distribution of the silicotitanate composition of the present invention is a particle diameter distribution that is not monomodal, and further tends to be a multimodal particle diameter distribution. The volume frequency of particles over all the particle diameters tends to be 5% or less.

The silicotitanate composition of the present invention is a particle having such characteristics. A state of the particle having such characteristics is considered to contribute to enhancement in at least any of Cs and Sr adsorption properties.

The silicotitanate composition of the present invention has high Cs adsorption properties. A Cs distribution coefficient (hereinafter referred to "$Kd_{(Cs)}$") of the silicotitanate composition of the present invention may be 100,000 mL/g or more, preferably 200,000 mL/g or more, and more preferably 1,000,000 mL/g.

It is preferable that the silicotitanate composition of the present invention have high Sr adsorption properties. A Sr distribution coefficient (hereinafter referred to "$Kd_{(Sr)}$") of the silicotitanate composition of the present invention may be 3,000 mL/g, preferably 10,000 mL/g or more, and more preferably 20,000 mL/g or more.

In the present invention, the distribution coefficient (Kd) is an indication of adsorption properties of an adsorbent when a metal ion-containing medium to be treated (hereinafter sometimes simply referred to as "medium to be treated") is subjected to an adsorption treatment of metal ions using the adsorbent. The distribution coefficient can be determined by the following equation (1):

$$Kd = (C_0 - C)/C \times V/m \quad (1).$$

Kd: distribution coefficient (mL/g)
$C_0$: metal ion concentration in medium to be treated before adsorption treatment (ppm)
C: metal ion concentration in medium to be treated during equilibration of adsorption (ppm)
V: volume of medium to be treated (mL)
m: weight of adsorbent (g)

For example, when a Cs-containing aqueous solution as the medium to be treated is subjected to a Cs adsorption treatment using the silicotitanate composition as the adsorbent, the Cs adsorption properties of the silicotitanate composition can be determined as the Cs distribution coefficient by the above-described equation (1) using the following values.

$Kd_{(Cs)}$: Cs distribution coefficient (mL/g)
$C_0$: metal ion concentration in Cs-containing aqueous solution before adsorption treatment (ppm)
C: metal ion concentration in Cs-containing aqueous solution during equilibration of adsorption (ppm)
V: volume of Cs-containing aqueous solution (mL)
m: weight of silicotitanate composition (g)

In the similar manner, the strontium distribution coefficient ($Kd_{(Sr)}$), the calcium distribution coefficient (hereinafter referred to as "$Kd_{(Ca)}$"), and the magnesium distribution coefficient (hereinafter referred to as "$Kd_{(Mg)}$") can be determined.

It is preferable that the silicotitanate composition of the present invention be a molded body containing the silicotitanate composition and an inorganic binder. When the silicotitanate composition is a molded body, the strength of the silicotitanate composition of the present invention is enhanced, and in particular, the silicotitanate composition has excellent abrasion resistance. For example, when a liquid as the medium to be treated is continuously passed through a packed bed with an adsorbent containing the molded body of the silicotitanate composition of the present invention to perform adsorption treatments of Cs and Sr, abrasion of the molded body is suppressed. Therefore, the adsorbent can be used for extended periods.

When the silicotitanate composition of the present invention is a molded body, an inorganic binder contained in the molded body may be preferably at least one binder selected from the group consisting of clay, silica sol, alumina sol, and zirconia sol. As the more preferable inorganic binder, may be mentioned clay. The clay may be preferably at least one kind of the group consisting of kaolin, sepiolite, and attapulgite.

When the silicotitanate composition of the present invention is a molded body, it is preferable that the shape thereof be at least one selected from the group consisting of spherical, nearly spherical, elliptical, cylindrical, polyhedral, and indefinite shapes.

When the silicotitanate composition of the present invention is a molded body, the molded body preferably has a diameter of 0.1 mm or more and 2.0 mm or less.

When the silicotitanate composition of the present invention is a molded body, the molded body of the silicotitanate composition can be obtained by a production method including a molding step of kneading the silicotitanate composition of the present invention and an inorganic binder and molding the kneaded mixture, and a firing step of firing the molded body obtained in the molding step.

In the molding step, at least any of a molding aid and water may be used in order to improve the moldability of the kneaded mixture. Preferable examples of the molding aid may include carboxymethyl cellulose.

In the firing step, the temperature of firing the molded body may be 100° C. or higher and 400° C. or lower. When the firing temperature is 100° C. or higher, the strength of the obtained molded body is further enhanced. When the firing temperature is 400° C. or lower, the strength of the obtained molded body is sufficient.

The silicotitanate composition of the present invention can be used as a Cs adsorbent. When the silicotitanate composition of the present invention is used as the Cs adsorbent, the adsorbent is not limited as long as the adsorbent includes the silicotitanate composition in at least any form of a silicotitanate composition powder and a silicotitanate composition molded body. The Cs adsorbent of the present invention may include at least one selected from the group consisting of an ion-exchange resin, clay mineral, a zeolite, a ferrocyanide compound, and an organometallic complex.

Since the silicotitanate composition of the present invention has excellent Sr adsorptivity, the silicotitanate composition may also be used as a Sr adsorbent.

When the silicotitanate composition of the present invention is used in an adsorption method for at least any of Cs and Sr, the silicotitanate composition may be brought into contact with the medium to be treated containing at least any of Cs and Sr. The medium to be treated may be at least any of a liquid and a solid. Examples thereof may include soil, waste materials, seawater, and groundwater.

A state in which the silicotitanate composition is brought into contact with the medium to be treated over 24 hours or more may be referred to as adsorption equilibration.

Even when the silicotitanate composition of the present invention is brought into contact with the medium to be treated containing one or more metal ions other than Cs, the silicotitanate composition selectively adsorbs Cs. Therefore, the silicotitanate composition of the present invention can be used in a Cs adsorption treatment not only for the medium to be treated containing Cs but also for the medium to be treated containing one or more metal ions other than Cs.

It is preferable that the medium to be treated be an aqueous solution containing two or more metal ions including Cs. Since Kd of Cs in the aqueous solution containing two or more metal ions including Cs is high, the silicotitanate composition of the present invention has high Cs selective adsorptivity. Examples of the aqueous solution containing two or more metal ions including Cs may include an aqueous solution containing two or more metal ions selected from the group consisting of Na, Mg, Ca, K, and Sr in addition to Cs, for example, seawater and simulated seawater.

In an adsorption method for at least any of Cs and Sr using the silicotitanate composition of the present invention, the temperature of a system including the silicotitanate composition and the medium to be treated may be −30° C. or higher and 60° C. or lower, preferably 0° C. or higher and 50° C. or lower, more preferably 10° C. or higher and 30° C. or lower, and further preferably 20° C. or higher and 30° C. or lower. When the temperature of the system falls within the above-described range, the silicotitanate composition of the present invention has sufficient Cs and Sr adsorption properties.

Even when the silicotitanate composition of the present invention is brought into contact with the medium to be treated containing Cs and Sr, the silicotitanate composition adsorbs both Cs and Sr. Even when the silicotitanate composition of the present invention is brought into contact with the medium to be treated containing one or more metal ions other than Cs and Sr, the silicotitanate composition selectively adsorbs both Cs and Sr. Therefore, the silicotitanate composition of the present invention can be used not only for the medium to be treated containing Cs and Sr but also for the medium to be treated containing one or more metal ions other than Cs and Sr.

The silicotitanate composition of the present invention can be used as an adsorbent for at least any of Cs and Sr.

The silicotitanate composition of the present invention can be used in an adsorption method for at least any of Cs and Sr.

The silicotitanate composition obtained by the production method of the present invention may include an S-type silicotitanate. The silicotitanate composition obtained by the production method of the present invention may be a silicotitanate composition that consists only of the S-type silicotitanate, or a silicotitanate composition that includes the S-type silicotitanate and niobium and has diffraction peaks at angles of at least 2θ=27.8±0.5° and 2θ=29.4±0.5° (hereinafter also referred to as "silicotitanate composition A"). Furthermore, the silicotitanate composition may also be a silicotitanate composition that includes the S-type silicotitanate and niobium and has at least two or more diffraction peaks at angles selected from the group consisting of 2θ=8.8±0.5°, 2θ=10.0±0.5°, and 2θ=29.6±0.5° (hereinafter also referred to as "silicotitanate composition B").

In this specification, 2θ is a value (°) of X-ray diffraction angle in a powder X-ray diffraction pattern using CuKα ray (wavelength λ=1.5405 Å).

When the silicotitanate composition obtained by the production method of the present invention is only the S-type silicotitanate, it is preferable that in the crystallization step, a silicotitanate gel having the following mole ratios be crystallized.

Si/Ti mole ratio: 0.5 or more and 2.0 or less
$H_2O$/Ti mole ratio: 20 or more and 150 or less
M/Ti mole ratio: 1.0 or more and 5.0 or less
$M_{dope}$/Ti mole ratio: 0 or more and less than 0.36

When in the crystallization step, the silicotitanate gel having such mixed mole ratios is crystallized, the silicotitanate including the S-type silicotitanate can be obtained.

The $M_{dope}$ Ti mole ratio of the composition consisting only of the S-type silicotitanate of the present invention is 0 or more and less than 0.35. When the $M_{dope}$/Ti mole ratio of the composition is 0 or more and less than 0.35, the composition has high Cs and Sr adsorptivities. It is preferable that the $M_{dope}$/Ti mole ratio of the composition be 0.20 or more and less than 0.35 since the composition has particularly high Cs adsorptivity. It is preferable that the doped metal be niobium (Nb) since the composition has particularly high Cs adsorptivity.

The Si/Ti mole ratio of the composition consisting only of the S-type silicotitanate of the present invention is preferably 0.2 or more and 2.0 or less, more preferably 0.2 or more and 1.5 or less, further preferably 0.5 or more and 1.0 or less, and still further preferably 0.6 or more and 0.8 or less. When the Si/Ti mole ratio of the composition is 0.2 or more and 2.0 or less, the composition has higher Cs adsorptivity.

The M/Ti mole ratio of the composition consisting only of the S-type silicotitanate of the present invention is preferably 0.5 or more and 4.0 or less, more preferably 1.0 or more and 4.0 or less, still more preferably 1.0 or more and 2.0 or less, and further preferably 1.0 or more and 1.5 or less. When the M/Ti mole ratio of the composition is 0.5 or more and 4.0 or less, the composition has higher Cs adsorptivity.

When the silicotitanate composition obtained by the production method of the present invention is the silicotitanate composition A, it is preferable that in the crystallization step, a silicotitanate gel having the following mole ratios be crystallized.

Si/Ti mole ratio: 0.5 or more and 2.0 or less
$H_2O$/Ti mole ratio: 20 or more and 100 or less preferably 50 or more and 100 or less, and more preferably 50 or more and 90 or less
M/Ti mole ratio: 1.0 or more and 5.0 or less
Nb/Ti mole ratio: 0.36 or more and 0.65 or less, and preferably 0.36 or more and 0.55 or less When in the crystallization step, the silicotitanate gel having such mixed mole ratios is crystallized, the silicotitanate composition A can be obtained.

The silicotitanate composition A includes the S-type silicotitanate and niobium and has diffraction peaks at at least 2θ=27.8±0.5° and 2θ=29.4±0.5°. The silicotitanate composition having the diffraction peaks has higher Sr adsorption properties.

A state of niobium in the silicotitanate composition A is not particularly limited as long as the composition contains niobium. For example, niobium may be a niobium-containing compound, preferably any of compound selected from the group consisting of a niobate, a niobium silicate, a niobium titanate, and a Nb—Si—Ti-based oxide. The S-type silicotitanate may include niobium.

It is preferable that the silicotitanate composition A have at least 2θ and XRD peak intensity ratios shown in Table 3. Since the silicotitanate composition A has such 2θ and XRD peak intensity ratios, the silicotitanate composition of the present invention has higher Sr adsorption properties.

TABLE 3

| X-RAY DIFFRACTION ANGLE 2θ [°] | XRD PEAK INTENSITY RATIO |
|---|---|
| 11.3 ± 0.5 | 100 |
| 27.8 ± 0.5 | 30 OR MORE AND 70 OR LESS |
| 29.4 ± 0.5 | 30 OR MORE AND 70 OR LESS |

The XRD peak intensity ratio in Table 3 is a relative value of XRD peak intensity at each 2θ when the XRD peak intensity at 2θ=11.3±0.5 is taken as 100.

It is preferable that the silicotitanate composition A be a silicotitanate composition including a crystalline substance having diffraction peaks at 2θ=27.8±0.5° and 2θ=29.4±0.5° (hereinafter also referred to as "crystalline substance A") and the S-type silicotitanate. Herein, the crystalline substance A may be at least one substance selected from the group consisting of crystalline silicotitanate other than the S-type silicotitanate, a titanate, a niobate, a silicate, niobium silicate, niobium titanate, and a Nb—Si—Ti-based oxide, preferably the crystalline silicotitanate other than the S-type silicotitanate, and more preferably a silicotitanate having a vinogradovite structure (hereinafter also referred to as "V-type silicotitanate").

The V-type silicotitanate is a crystalline silicotitanate having an XRD peak corresponding to vinogradovite in American Mineralogist Crystal Structure Database (http://rruff.geo.arizona.edu./AMS/amcsd.php, search date: Mar. 20, 2015). The V-type silicotitanate has characteristic XRD peaks at at least 2θ=27.8±0.5° and 2θ=29.4±0.5°.

When the silicotitanate composition A includes the S-type silicotitanate and a crystalline silicotitanate other than the S-type silicotitanate (hereinafter also referred to as "non-S-type silicotitanate"), the silicotitanate composition A is not limited as long as it includes the S-type silicotitanate and the non-S-type silicotitanate. The silicotitanate composition A may be at least any of a mixture of the S-type silicotitanate and the non-S-type silicotitanate, and a silicotitanate including a mixed crystal of the S-type silicotitanate and the non-S-type silicotitanate.

The Nb/Ti mole ratio of the silicotitanate composition A is 0.35 or more and 0.60 or less. Since the composition has higher Sr adsorptivity, it is preferable that the Nb/Ti mole ratio be 0.35 or more and 0.50 or less.

The M/Ti mole ratio of the silicotitanate composition A is preferably 0.50 or more and 4.0 or less, more preferably 0.50 or more and 3.0 or less, and further preferably 1.36 or more and 3.0 or less. When the M/Ti mole ratio of the silicotitanate composition A is 0.50 or more and 4.0 or less, the silicotitanate composition has higher Sr adsorptivity.

The Si/Ti mole ratio of the silicotitanate composition A is preferably 0.40 or more and 2.0 or less, more preferably 0.50 or more and 1.8 or less, and further preferably 0.74 or more and 1.2 or less. When the Si/Ti mole ratio of the silicotitanate composition A is 0.40 or more and 2.0 or less, the silicotitanate composition A has higher Sr adsorptivity.

When the silicotitanate composition obtained by the production method of the present invention is the silicotitanate composition B, it is preferable that in the crystallization step, a silicotitanate gel having the following mole ratios be crystallized:

Si/Ti mole ratio: 0.5 or more and 2.0 or less,
$H_2O$/Ti mole ratio: more than 100 and 150 or less,
M/Ti mole ratio: 1.0 or more and 5.0 or less, and
Nb/Ti mole ratio: 0.36 or more and 0.65 or less, or
Si/Ti mole ratio: 0.5 or more and 2.0 or less, H$_2$O/Ti mole ratio: 20 or more and 150 or less, and preferably 50 or more and 150 or less, M/Ti mole ratio: 1.0 or more and 5.0 or less, and Nb/Ti mole ratio: more than 0.65 and 1.5 or less, and preferably more than 0.65 and 1.2 or less.

When in the crystallization step, the silicotitanate gel having such mixed mole ratios is crystallized, the silicotitanate composition B can be obtained.

The silicotitanate composition B includes the S-type silicotitanate and niobium and has diffraction peaks at two or more angles in the group that comprises at least 2θ=8.8±0.5°, 2θ=10.0±0.5° and 2θ=29.6±0.5°. The silicotitanate composition having the diffraction peaks has higher Sr adsorptivity.

A state of niobium in the silicotitanate composition B is not particularly limited as long as niobium is contained in the composition. For example, niobium may be a niobium-containing compound, preferably any of compound selected from the group consisting of a niobate, a niobium silicate, a niobium titanate, and a Nb—Si—Ti-based oxide. The S-type silicotitanate may contain niobium.

It is preferable that the silicotitanate composition B have at least 2θ and XRD peak intensity ratios shown in Table 4. Since the silicotitanate composition B has such 2θ and XRD peak intensity ratios, the silicotitanate composition of the present invention has higher Sr adsorption properties.

TABLE 4

| X-RAY DIFFRACTION ANGLE 2θ [°] | XRD PEAK INTENSITY RATIO |
|---|---|
| 8.8 ± 0.5 | 5 OR MORE AND 20 OR LESS |
| 10.0 ± 0.5 | 5 OR MORE AND 20 OR LESS |
| 11.3 ± 0.5 | 100 |
| 29.6 ± 0.5 | 5 OR MORE AND 40 OR LESS |

The XRD peak intensity ratio in Table 4 is a relative value of XRD peak intensity at each 2θ relative to an XRD peak intensity when the peak intensity at 2θ=11.3±0.5 is taken as 100.

It is preferable that the silicotitanate composition B be a silicotitanate composition including a crystalline substance having diffraction peaks at two or more angles in the group that comprises 2θ=8.8±0.5°, 2θ=10.0±0.5°, and 2θ=29.6±0.5° (hereinafter also referred to as "crystalline substance B") and the S-type silicotitanate. Herein, the crystalline substance B may be at least one substance selected from the group consisting of crystalline silicotitanate other than the S-type silicotitanate, a titanate, a niobate, a silicate, niobium silicate, niobium titanate, and Nb—Si—Ti-based oxide, preferably at least any of a niobate and a silicate, and more preferably a niobate.

Herein, the crystalline substance B may be two or more compounds as long as it has the aforementioned XRD peaks, and is preferably two or more niobates.

When the crystalline substance B includes a niobate, the composition of the niobate included in the silicotitanate composition B may be Na$_x$Nb$_y$O$_z$·nH$_2$O (wherein x=1 to 20, y=1 to 30, z=5 to 80, and n=10 to 100).

For example, the Nb/Ti mole ratio of the silicotitanate composition B may be 0.35 or more and less than 0.60, or 0.60 or more and 1.5 or less. When the Nb/Ti mole ratio of the silicotitanate composition B falls within the above-described range, the composition B has higher Cs and Sr adsorptivities. It is preferable that the Nb/Ti mole ratio of the silicotitanate composition B be 0.35 or more and 1.20 or less.

The M/Ti mole ratio of the silicotitanate composition B is preferably 0.50 or more and 4.0 or less, more preferably 0.50 or more and 3.0 or less, and further preferably 1.1 or more and 2.5 or less. When the M/Ti mole ratio of the silicotitanate composition B is 0.50 or more and 4.0 or less, the silicotitanate composition B has higher Cs and Sr adsorptivities.

The Si/Ti mole ratio of the silicotitanate composition B is preferably 0.40 or more and 2.0 or less, more preferably 0.50 or more and 1.8 or less, and further preferably 0.74 or more and 1.6 or less. When the Si/Ti mole ratio of the silicotitanate composition B is 0.40 or more and 2.0 or less, the silicotitanate composition B has higher Cs and Sr adsorptivities.

Advantageous Effects of Invention

The silicotitanate composition of the present invention has very high Cs adsorptivity. Further, the silicotitanate composition has high Sr adsorptivity.

The composition including only the S-type silicotitanate of the present invention has particularly high Cs adsorptivity. The composition consisting only of the S-type silicotitanate of the present invention can selectively adsorb Cs from the medium to be treated containing a plurality of metal ions, particularly like seawater. The composition consisting only of the S-type silicotitanate of the present invention can efficiently adsorb Cs from the medium to be treated containing a small amount of Cs.

The silicotitanate composition A has particularly high Sr adsorptivity. The silicotitanate composition A can selectively adsorb Sr from the medium to be treated containing a plurality of metal ions, particularly like seawater. The silicotitanate composition A can efficiently adsorb Sr from the medium to be treated containing a small amount of Sr.

The silicotitanate composition B has especially high Cs and Sr adsorptivities. The silicotitanate composition B can selectively adsorb Cs and Sr from the medium to be treated containing a plurality of metal ions, particularly like seawater. The silicotitanate composition B can efficiently adsorb Cs and Sr from the medium to be treated containing a small amount of Sr.

According to the production method of the present invention, the silicotitanate composition can be safely produced using the inorganic titanium compound and the inorganic silicon compound that are general and easily available, and a general-purpose autoclave can be used.

In the production method of the present invention, an organic alkoxy metal compound such as an organic alkoxy titanium compound and an organic alkoxy silicon compound that are hazardous or dangerous materials is not used and a structure directing agent is also not required. For this reason, the production cost is lower. Therefore, the production method of the present invention is more industrial.

The silicotitanate composition obtained by the production method of the present invention has Sr and Cs selective adsorption properties.

EXAMPLES

Figure 1:
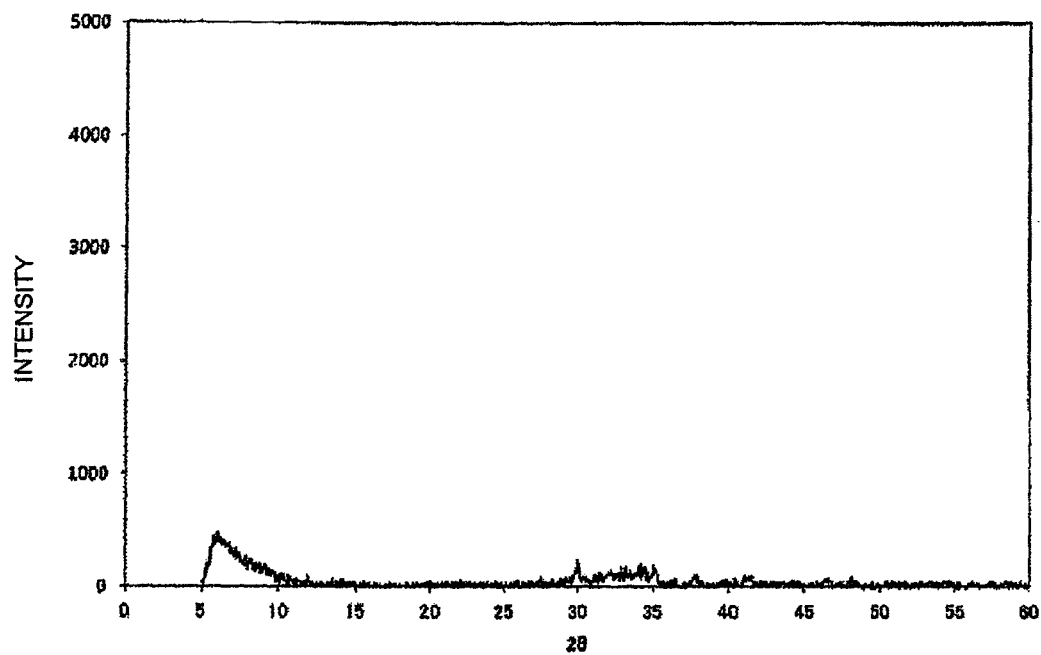
FIG. 1 is an XRD chart of a silicotitanate gel obtained in Example 1.

Hereinafter, the present invention will be described specifically with reference to Examples. However, the present invention is not limited to these Examples.

(Powder X-Ray Diffraction Measurement)

An XRD pattern of a sample was measured using a general X-ray diffractometer (trade name: MXP3HF-type X-ray diffractometer, manufactured by MAC Science Co. Ltd.). Measurement conditions are as follows.

Radiation source: CuKα-ray (λ=1.5405 Å)
Measurement mode: step scan
Scan condition: 0.04°/second
Divergence slit: 1.00 deg.
Scattering slit: 1.00 deg.
Receiving slit: 0.30 mm
Measurement time: 3.00 seconds
Measurement range: 2θ=5.0° to 60.0°

A sitinakite structure was identified by comparison of the obtained XRD pattern with XRD peaks of silicotitanate of sitinakite structure described in Reference Document 1 or 2 or Reference HP.

(Composition Analysis of Silicotitanate Composition)

The composition analysis of a crystallized product was measured by a general ICP method. In the measurement, a general ICP-AES (device name: OPTIMA3000DV, manufactured by PerkinElmer Inc.) was used.

(Measurement of Sr and Cs Ion Concentrations)

As a medium to be treated, an aqueous solution containing at least any of Cs and Sr and metal ions that simulated seawater components (hereinafter also referred to as "simulated seawater") was prepared, and subjected to an adsorption treatment. The aqueous solution was appropriately diluted, and the Sr ion concentration in the aqueous solution was measured by the ICP method. In the measurement, a general ICP-AES (device name: OPTIMA3000DV, manufactured by PerkinElmer Inc.) was used. The concentrations of Ca, Mg, Na, and K were measured in the same manner.

The Cs concentration in the aqueous solution was measured by ICP-MASS (device name: NExION300S, manufactured by PerkinElmer Inc.).

From the obtained concentration of each metal, Kd of each metal was calculated.

(Removal Ratio of Metal)

The removal ratio of each metal by the adsorption treatment was determined by the following equation (2):

$$\text{Removal ratio} = (C_0 - C)/C_0 \times 100 \qquad (2).$$

$C_0$: metal ion concentration in metal ion-containing aqueous solution before adsorption treatment (ppm)

$C$: metal ion concentration in metal ion-containing aqueous solution in adsorption equilibration (ppm)

(Measurement of Particle Diameter Distribution)

A cumulative curve of particle diameter distribution was measured by light-scattering particle size distribution measurement. In the measurement, a general light-scattering particle diameter distribution measurement device (MICROTRAC HRA MODEL: 9320-X1000 manufactured by NIKKISO CO., LTD.) was used. As a pre-treatment, a sample was suspended in distilled water and dispersed by an ultrasonic homogenizer for 2 minutes. From the obtained cumulative curve of particle diameter distribution, the average particle diameter and the cumulative value at which the particle diameter was 10 μm were obtained.

(Observation of Particles)

The particles of the sample were observed by a general scanning electron microscope (device name: JSM-6390LV, manufactured by JEOL Ltd.).

Example 1

20 g of sodium silicate ($SiO_2$; 29.1% by weight), 46 g of an aqueous solution of titanium sulfate ($TiO_2$; 13.31% by weight), 50 g of sodium hydroxide (NaOH; 48% by weight), and 77 g of pure water were mixed to obtain a raw material mixture of the following composition.

Si/Ti mole ratio=1.31
Na/Ti mole ratio=3.3
$H_2O$/Ti mole ratio=82

The obtained raw material mixture was in a gel form.

A part of the obtained raw material mixture was collected, separated into a solid and a liquid, washed with hot water, and dried in the air at 80° C., to obtain the raw material mixture in a powder form. An XRD chart of the powder of the raw material mixture is shown in FIG. 1. As seen from FIG. 1, the XRD pattern of the obtained raw material mixture had no crystalline peak, and therefore, it was found that the raw material mixture was amorphous. Thus, the raw material mixture was confirmed to be an amorphous silicotitanate gel.

The raw material mixture in the gel form was charged in a stainless steel autoclave (trade name: KH-02, manufactured by HIRO COMPANY) with stirring. The raw material mixture was crystallized by heating at 180° C. for 72 hours, to obtain a crystallized product.

The pressure during crystallization was 0.8 MPa, which corresponded to a water vapor pressure at 180° C. The crystallized product was cooled, filtered, washed, and dried to obtain a silicotitanate composition in a powder form.

Figure 2:
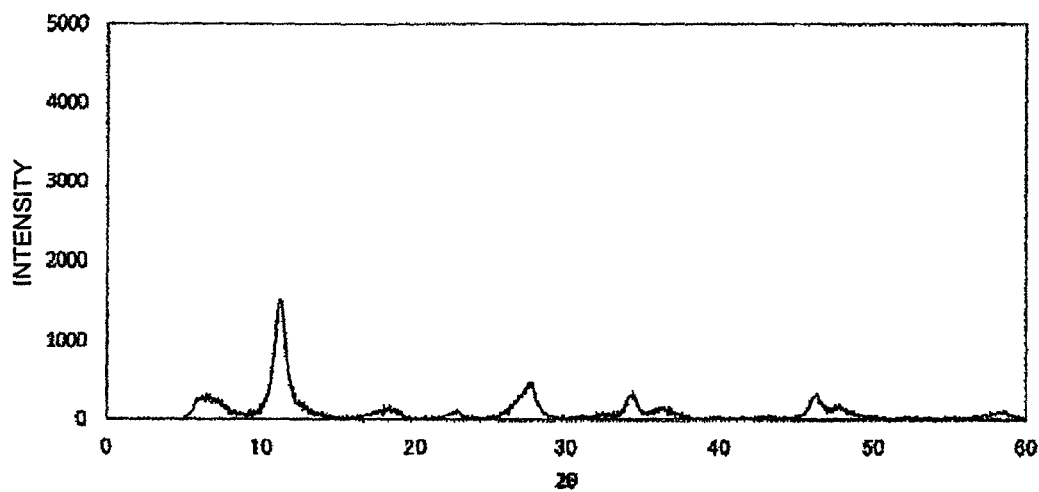
FIG. 2 is an XRD chart of a silicotitanate composition of Example 1.

From an XRD chart of the obtained silicotitanate composition, a peak attributable to a component other than a sitinakite structure was not confirmed. The silicotitanate composition of this example was confirmed to be a single phase of S-type silicotitanate. The XRD chart of the silicotitanate composition of this example is shown in FIG. 2.

The Si/Ti mole ratio of the obtained silicotitanate composition was 0.68, and the Na/Ti mole ratio was 1.07. Results of composition analysis of the obtained silicotitanate composition are shown in Table 6.

Example 2

A crystallized product was obtained in the same manner as in Example 1 except that a raw material mixture had the following composition.

Si/Ti mole ratio=1.25
Na/Ti mole ratio=3.6
$H_2O$/Ti mole ratio=82

The obtained raw material mixture was an amorphous silicotitanate gel, and the pressure during crystallization was 0.8 MPa. The crystallized product was cooled, filtered, washed, and dried to obtain a silicotitanate composition in a powder form.

Figure 3:
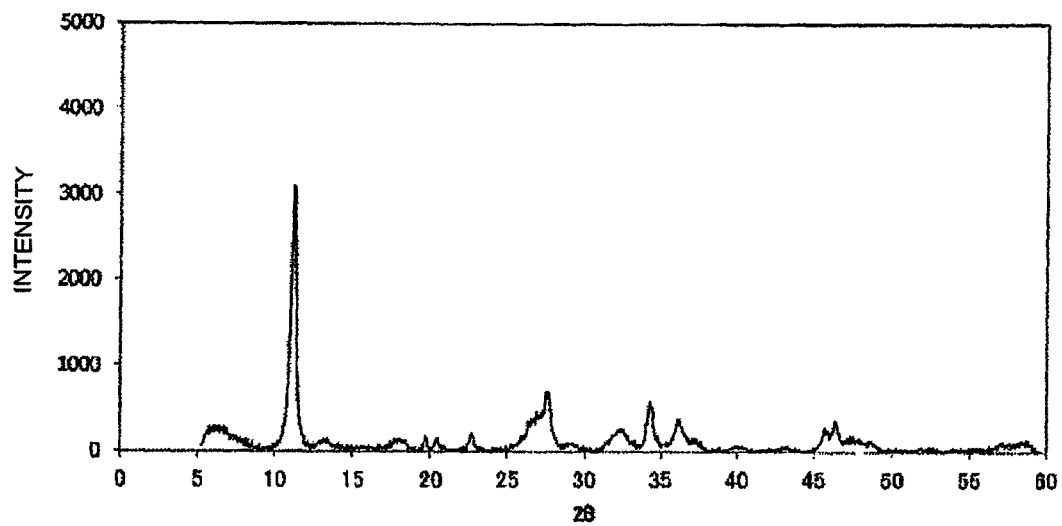
FIG. 3 is an XRD chart of a silicotitanate composition of Example 2.

From an XRD chart of the obtained silicotitanate composition, an XRD peak attributable to a component other than a sitinakite structure was not confirmed. The silicotitanate composition of this example was confirmed to be a single phase of S-type silicotitanate. The XRD chart of the silicotitanate composition of this example is shown in FIG. 3.

The Si/Ti mole ratio of the obtained silicotitanate composition was 0.75, and the Na/Ti mole ratio was 1.31. Results of composition analysis of the obtained silicotitanate composition are shown in Table 6.

(Evaluation of Sr Adsorption Properties)

For the obtained silicotitanate composition, the Sr selective adsorption properties from simulated seawater were evaluated. As the simulated seawater containing Sr, an aqueous solution containing the following composition was prepared using NaCl, $MgCl_2$, $CaCl_2$, $Na_2SO_4$, KCl, and a Sr standard solution. This aqueous solution was used as a measurement solution.

Na: 870 ppm by weight (derived from NaCl)
Mg: 118 ppm by weight
Ca: 41 ppm by weight
Na: 126 ppm by weight (derived from $Na_2SO_4$)
K: 32 ppm by weight
Sr: 1 ppm by weight
(Herein, the total concentration of Na was 996 ppm by weight)

To 1 L of the measurement solution, 0.05 g of the silicotitanate composition was added, and the mixture was mixed with stirring at 25° C. and 800 rpm for 24 hours. Thus, the adsorption properties were evaluated. As a pre-treatment, the silicotitanate composition was heated at 100° C. in the air for 1 hour. After mixing, the silicotitanate composition was separated from the measurement solution by filtration. The Sr concentration in the collected measurement solution was measured.

From the concentration of each component in the measurement solution after the evaluation of the adsorption properties, $Kd_{(Sr)}$ was determined by the aforementioned equation (1), and the removal ratio was determined by the aforementioned equation (2).

After the evaluation of the adsorption properties, the Sr concentration in the measurement solution was 0.52 ppm by weight, the calcium concentration was 38 ppm by weight, and the magnesium concentration was 110 ppm by weight. Kd of each metal was as follows.

$Kd_{(Sr)}$: 18,000 mL/g
$Kd_{(Ca)}$: 1,600 mL/g
$Kd_{(Mg)}$: 1,500 mL/g

The removal ratio of each metal was as follows.
Sr: 48%
Ca: 7.3%
Mg: 6.8%

Therefore, $Kd_{(Sr)}$ was 10,000 mL/g or more, and was larger than $Kd_{(Ca)}$ and $Kd_{(Mg)}$. The Sr removal ratio was larger than calcium and magnesium removal ratios. The silicotitanate composition of this example was confirmed to have Sr adsorption selectivity in the coexistence of seawater component.

(Evaluation of Cs Adsorption Properties)

For the obtained silicotitanate composition, the Cs selective adsorption properties from simulated seawater were evaluated. As simulated seawater containing Cs, an aqueous solution containing the following composition was prepared using NaCl, $MgCl_2$, $CaCl_2$, $Na_2SO_4$, KCl, and a Cs standard solution. This aqueous solution was used as a measurement solution.

Na: 1,740 ppm by weight (derived from NaCl)
Mg: 236 ppm by weight
Ca: 82 ppm by weight
Na: 252 ppm by weight (derived from $Na_2SO_4$)
K: 64 ppm by weight
Cs: 1 ppm by weight
(Herein, the total concentration of Na was 1,992 ppm by weight)

To 1 L of the measurement solution, 0.05 g of the silicotitanate composition was added, and the mixture was mixed with stirring at 25° C. and 800 rpm for 24 hours. As a pre-treatment, the silicotitanate composition was heated at 100° C. in the air for 1 hour. After mixing, the silicotitanate composition was separated from the measurement solution by filtration. The Cs concentration in the collected measurement solution was measured.

After the evaluation of the adsorption properties, the Cs concentration in the measurement solution was 0.08 ppm by weight.

From the concentration of each component in the measurement solution after the evaluation of the adsorption properties, $Kd_{(Cs)}$ was determined by the aforementioned equation (1), and the removal ratio was determined by the aforementioned equation (2).

$Kd_{(Cs)}$ was 230,000 mL/g. The Cs removal ratio was 92%. In the silicotitanate composition of this example, $Kd_{(Cs)}$ was 100,000 mL/g or more, and the Cs removal ratio was larger. Results of Cs and Sr adsorptivities of the silicotitanate composition of this example are shown in Table 6.

Example 3

A crystallized product was obtained in the same manner as in Example 1 except that a raw material mixture had the following composition.
Si/Ti mole ratio=1.14
Na/Ti mole ratio=4.0
$H_2O$/Ti mole ratio=82
The obtained raw material mixture was an amorphous silicotitanate gel, and the pressure during crystallization was 0.8 MPa. The crystallized product was cooled, filtered, washed, and dried to obtain a silicotitanate composition in a powder form.

Figure 4:
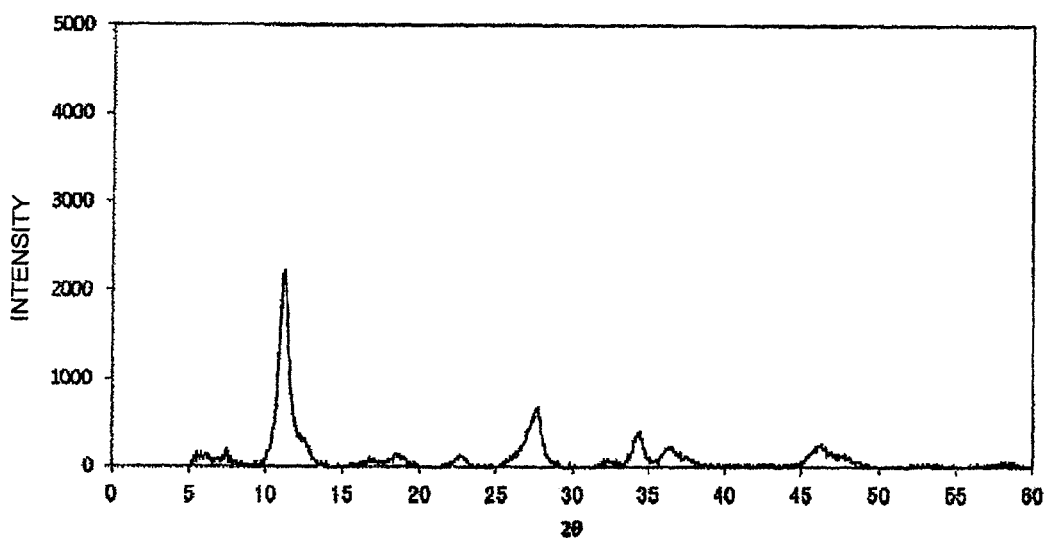
FIG. 4 is an XRD chart of a silicotitanate composition of Example 3.

From an XRD chart of the obtained silicotitanate composition, an XRD peak attributable to a component other than a sitinakite structure was not confirmed. The silicotitanate composition of this example was confirmed to be a single phase of S-type silicotitanate. The XRD chart of the silicotitanate composition of this example is shown in FIG. 4.

The Si/Ti mole ratio of the obtained silicotitanate composition was 0.72, and the Na/Ti mole ratio was 1.25. Results of composition analysis of the obtained silicotitanate composition are shown in Table 6.

Example 4

20 g of sodium silicate ($SiO_2$; 29.1% by weight), 71 g of an aqueous solution of titanium oxysulfate ($TiOSO_4$; 8.2% by weight), 63 g of sodium hydroxide (NaOH; 48% by weight), and 41 g of pure water were mixed to obtain an amorphous silicotitanate gel of the following composition.
Si/Ti mole ratio=1.34
Na/Ti mole ratio=3.3
$H_2O$/Ti mole ratio=82
To the obtained amorphous silicotitanate gel, a silicotitanate having a crystal of sitinakite structure was added as a seed crystal in an amount of 1% by weight relative to the amorphous silicotitanate gel. Subsequently, the gel was crystallized in the same manner as in Example 1. The crystallized product was further cooled, filtered, washed, and dried to obtain a silicotitanate composition.

Figure 5:
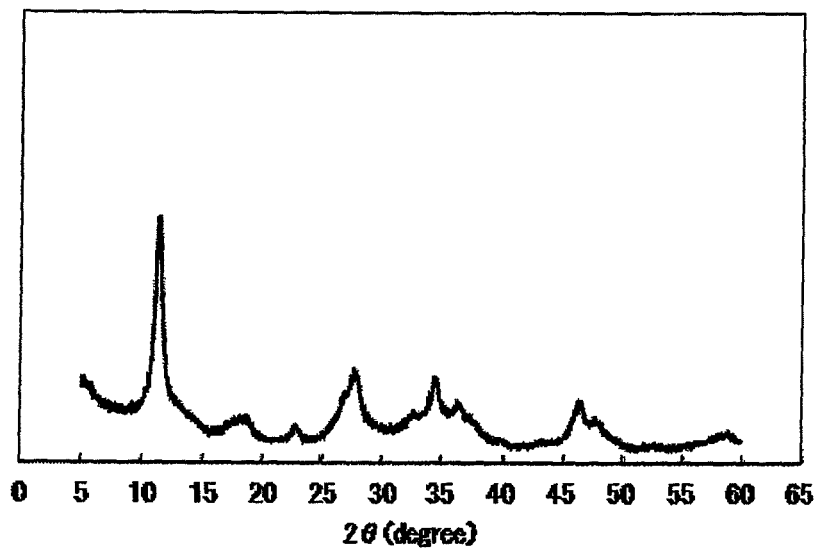
FIG. 5 is an XRD chart of a silicotitanate composition of Example 4.

From results of XRD measurement, the obtained silicotitanate composition was confirmed to have an X-ray diffraction angle and a diffraction peak intensity ratio shown in Table 5. The XRD pattern is shown in FIG. 5. The silicotitanate composition of this example was confirmed to be a single phase of S-type silicotitanate. Results of composition analysis of the obtained silicotitanate composition are shown in Table 6.

TABLE 5

| DIFFRACTION ANGLE 2θ [°] | XRD PEAK INTENSITY RATIO |
|---|---|
| 11.4 | 100 |
| 27.6 | 39 |

The Sr and Cs selective adsorption properties of the silicotitanate composition obtained in this example were evaluated using simulated seawater containing Sr and Cs as a medium to be treated. As the simulated seawater, an aqueous solution containing the following composition was prepared using NaCl, $MgCl_2$, $CaCl_2$, $Na_2SO_4$, KCl, a Sr standard solution, and a Cs standard solution.

Na: 870 ppm by weight (derived from NaCl)

Mg: 118 ppm by weight

Ca: 41 ppm by weight

Na: 126 ppm by weight (derived from $Na_2SO_4$)

K: 32 ppm by weight

Cs: 1 ppm by weight

Sr: 1 ppm by weight (Herein, the total concentration of Na was 996 ppm by weight)

To 1 L of the simulated seawater, 0.05 g of the silicotitanate composition of this example was added, and the simulated seawater was stirred at 25° C. and 800 rpm for 24 hours. The Sr and Cs adsorption properties of the silicotitanate composition were evaluated. As a pre-treatment, the silicotitanate composition was heated at 100° C. in the air for 1 hour.

After the evaluation of the adsorption properties, the Sr concentration in the simulated seawater was 0.86 ppm by weight, and the Cs concentration was 0.021 ppm by weight. Kd of each metal was as follows.

$Kd_{(Cs)}$: 932,000 mL/g $Kd_{(Sr)}$: 3,260 mL/g

The removal ratio of each metal was as follows.

Cs: 98.9%

Sr: 14%

Results of Cs and Sr adsorptivities of the silicotitanate composition of this example are shown in Table 6.

TABLE 6

| | Si/Ti MOLE RATIO | M/Ti MOLE RATIO | $Kd_{(Cs)}$ | Cs REMOVAL RATIO [%] | $Kd_{(Sr)}$ | Sr REMOVAL RATIO [%] |
|---|---|---|---|---|---|---|
| EXAMPLE 1 | 0.68 | 1.07 | NOT MEASURED | NOT MEASURED | NOT MEASURED | NOT MEASURED |
| EXAMPLE 2 | 0.75 | 1.31 | 230,000 | 92.0 | 18,000 | 48 |
| EXAMPLE 3 | 0.72 | 1.25 | NOT MEASURED | NOT MEASURED | NOT MEASURED | NOT MEASURED |
| EXAMPLE 4 | 0.67 | 1.04 | 932,000 | 98.9 | 3,260 | 14 |

Comparative Example 1

9 g of tetraethyl orthosilicate and 10 g of tetraisopropyl orthotitanate were mixed, and the mixture was mixed in a mixed solution of 9 g of a sodium hydroxide solution (NaOH; 48% by weight) and 49 g of water to obtain a raw material mixture having the following composition.
Si/Ti mole ratio=1.30
Na/Ti mole ratio=3.3
$H_2O$/Ti mole ratio=82

The obtained raw material composition was a silicotitanate gel. The silicotitanate gel included 6.6% by weight of ethyl alcohol and 7.5% by weight of isopropyl alcohol as byproducts. Since a large amount of alcohol was included, crystallization was not achieved by heating at 180° C. using the same autoclave as in Examples.

Comparative Example 2

A raw material mixture and a crystallized product were obtained in the same manner as in Example 1 except that titanium oxide (anatase type $TiO_2$ powder) was used instead of a titanium sulfate aqueous solution. The resulting crystallized product was cooled, filtered, washed, and dried to obtain a powder product.

Figure 6:
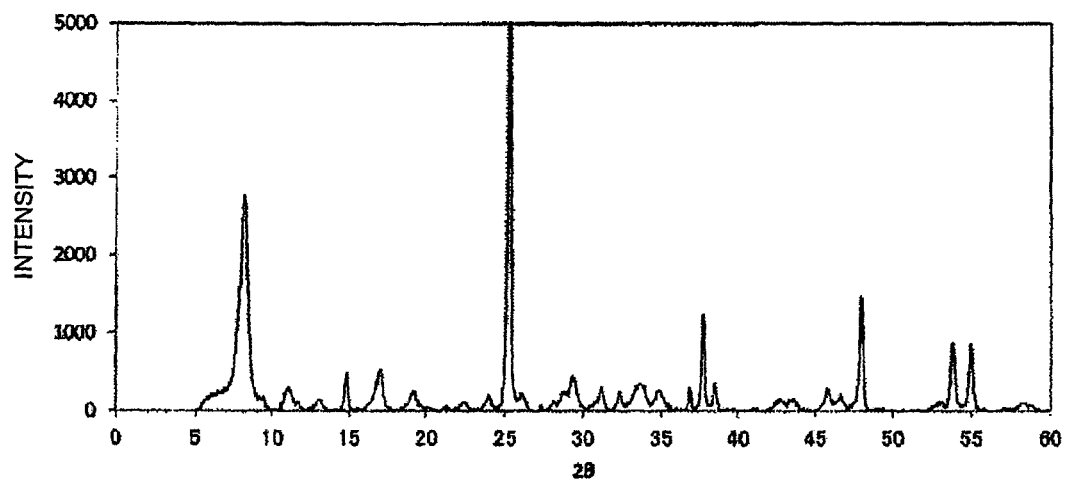
FIG. 6 is an XRD chart of a product of Comparative Example 2.

From an XRD chart of the obtained powder product, a peak attributable to titanium oxide was confirmed, but a peak attributable to a sitinakite structure was not confirmed. The XRD chart of the product of this comparative example is shown in FIG. 6.

From the XRD chart of the raw material mixture of this comparative example, an XRD peak of titanium oxide (anatase type $TiO_2$ powder) and an XRD peak of crystalline titanium oxide were confirmed. The raw material mixture of this comparative example was confirmed to be a mixture of crystalline titanium oxide but not to be a silicotitanate gel.

Example 5

20 g of sodium silicate ($SiO_2$; 29.1% by weight), 46 g of an aqueous solution of titanium sulfate ($TiO_2$; 13.31% by weight), 50 g of sodium hydroxide (NaOH; 48% by weight), and 77 g of pure water were mixed to obtain an amorphous silicotitanate gel of the following composition.
Si/Ti mole ratio=1.31
Na/Ti mole ratio=3.3
$H_2O$/Ti mole ratio=82

To the obtained amorphous silicotitanate gel, 0.73 g of niobium oxide ($Nb_2O_5$) powder was added, to obtain a raw material mixture including an amorphous silicotitanate gel of the following composition.
Si/Ti mole ratio=1.31
Na/Ti mole ratio=3.3
$H_2O$/Ti mole ratio=82
Nb/Ti mole ratio=0.2

A crystallized product was obtained by crystallizing the raw material mixture in the same manner as in Example 1 except that the aforementioned raw material mixture was used. The pressure during crystallization was 0.8 MPa. The crystallized product was cooled, filtered, washed, and dried in the same manner as in Example 1 to obtain a niobium-containing silicotitanate composition in a powder form.

Figure 7:
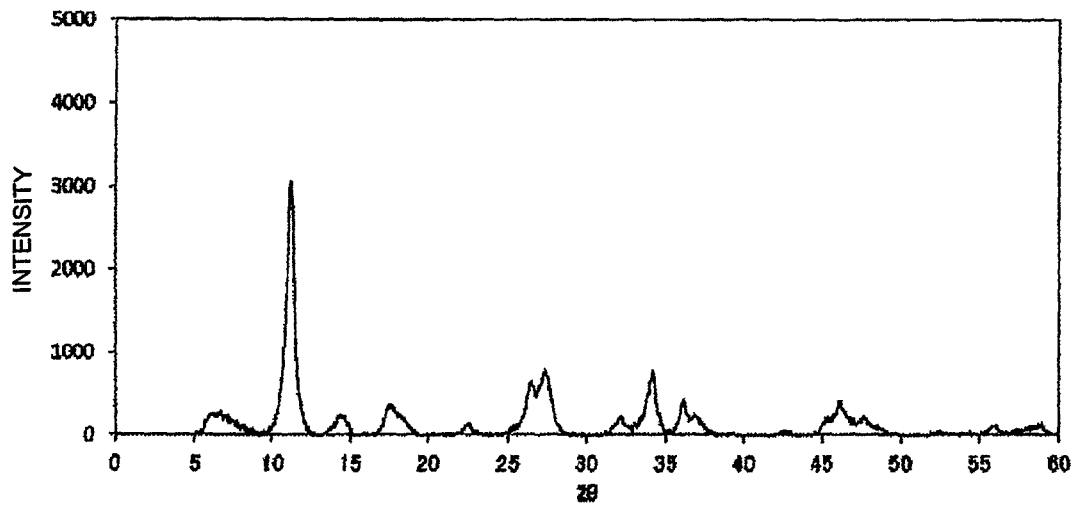
FIG. 7 is an XRD chart of a silicotitanate composition of Example 5.

From an XRD chart of the obtained niobium-containing silicotitanate composition, an XRD peak attributable to a component other than a sitinakite structure was not confirmed. The silicotitanate composition of this example was confirmed to be a single phase of S-type silicotitanate. The XRD chart of the silicotitanate composition of this example is shown in FIG. 7.

The Si/Ti mole ratio of the obtained niobium-containing silicotitanate composition was 0.67, the Na/Ti mole ratio was 1.35, and the Nb/Ti mole ratio was 0.16. Results of composition analysis of the obtained silicotitanate composition are shown in Table 9.

Figure 8:
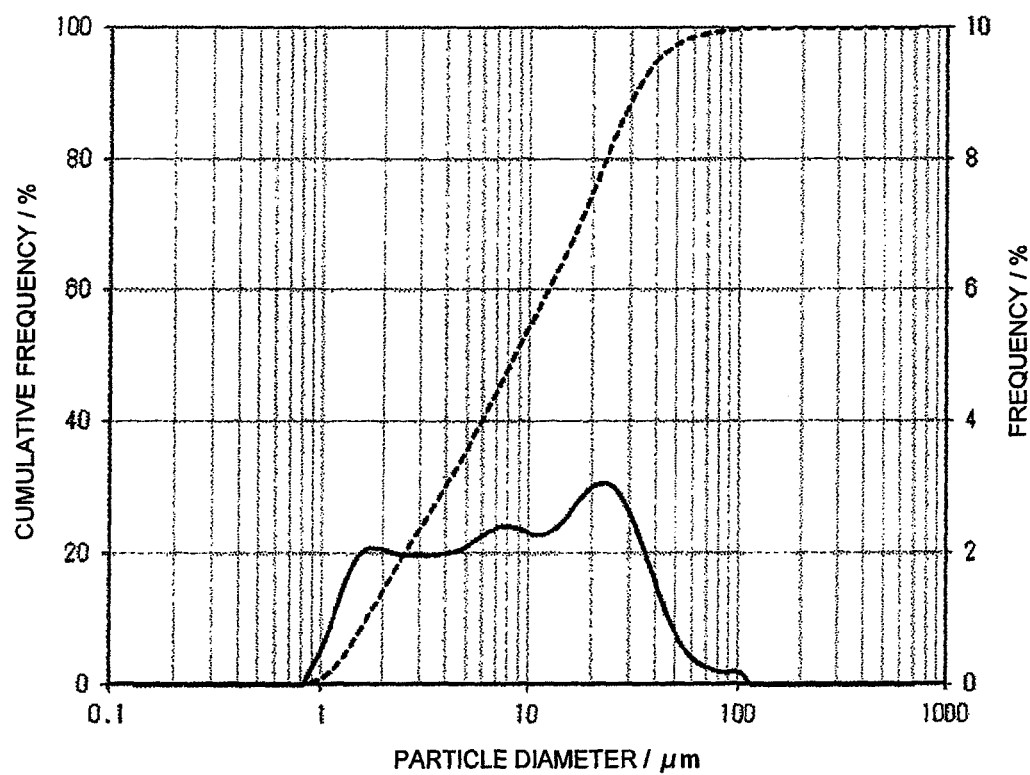
FIG. 8 shows a particle diameter distribution of the silicotitanate composition of Example 5 and a cumulative curve thereof. (solid line: frequency of particle diameter distribution, dashed line: cumulative frequency of particle diameter distribution)

FIG. 8 shows a cumulative curve of particle diameter distribution of this example. The average particle diameter of the obtained niobium-containing silicotitanate composition was 8.5 μm, and the cumulative value at which the particle diameter was 10 μm was 55%.

Figure 9:
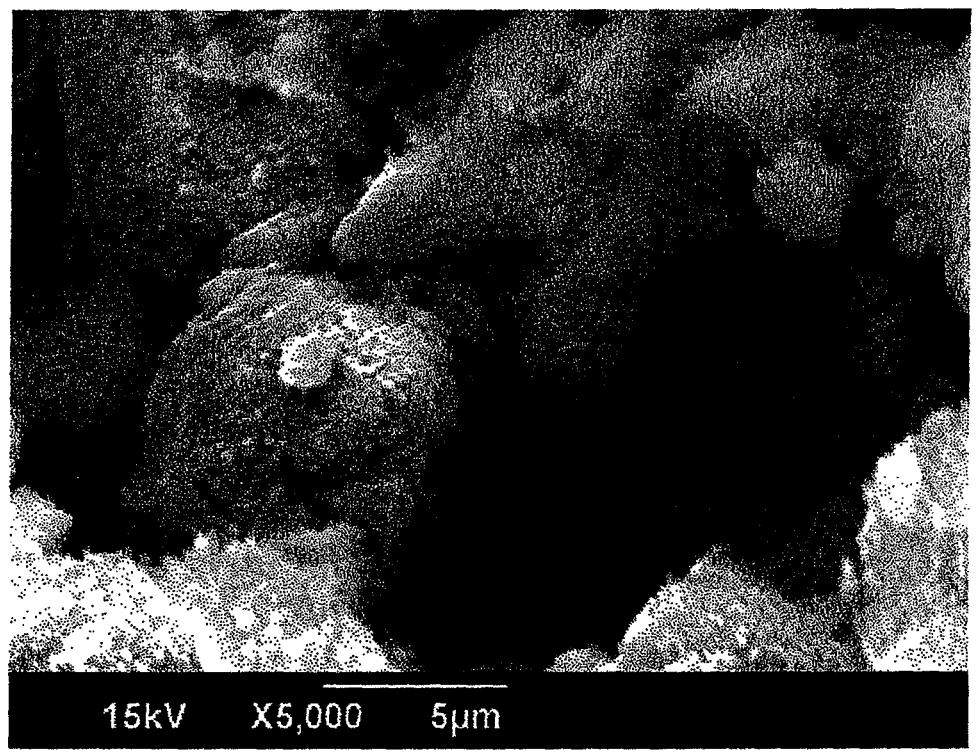
FIG. 9 is a SEM observation image of the silicotitanate composition of Example 5.

FIG. 9 shows a SEM observation image of the silicotitanate composition of this example.

(Evaluation of Sr Adsorption Properties)

The Sr selective adsorption properties were evaluated in the same manner as in Example 2. After the evaluation of the adsorption properties, the Sr concentration in the measurement solution was 0.50 ppm by weight, the calcium concentration that was a seawater component was 39.5 ppm by weight, and the magnesium concentration was 115 ppm by weight. Kd of each metal determined by the above-described equation (1) was as follows.
$Kd_{(Sr)}$: 20,000 mL/g
$Kd_{(Ca)}$: 7,600 mL/g
$Kd_{(Mg)}$: 5,200 mL/g The removal ratio of each metal determined by the above-described equation (2) was as follows.
Sr: 50%
Ca: 3.6%
Mg: 2.5%

Therefore, $Kd_{(Sr)}$ was 10,000 mL/g or more, and was larger than Kd of calcium and magnesium. The Sr removal ratio was larger than calcium and magnesium removal ratios. The silicotitanate composition of this example was confirmed to have Sr adsorption selectivity in the coexistence of seawater component.

As compared with Example 2 in which Nb was not contained, the Sr removal ratio was larger. The silicotitanate composition was confirmed to have excellent Sr adsorption selectivity in the coexistence of seawater component.

(Evaluation of Cesium Adsorption Properties)

For the obtained silicotitanate composition, the Cs selective adsorption properties from simulated seawater were evaluated in the same manner as in Example 2.

After the evaluation of the adsorption properties, the Cs concentration in the measurement solution was 0.011 ppm by weight. By the above-described equation (1), $Kd_{(Cs)}$ was 1,800,000 mL/g. The Cs removal ratio was 98.9%. Results of Cs and Sr adsorptivities of the silicotitanate composition of this example are shown in Table 9.

$Kd_{(Cs)}$ was very large as described above, and the removal ratio was also larger.

As compared with Example 2 in which Nb was not contained, the Sr and Cs removal ratios in the coexistence of seawater component in Example 4 were larger. A performance effect of a niobium additive was confirmed.

Example 6

20 g of sodium silicate ($SiO_2$; 29.1% by weight), 72 g of titanium oxysulfate ($TiO_2$; 16.3% by weight), 50 g of sodium hydroxide (NaOH; 48% by weight), and 77 g of pure water were mixed to obtain an amorphous silicotitanate gel of the following composition.
Si/Ti mole ratio=1.34
Na/Ti mole ratio=3.3
$H_2O$/Ti mole ratio=82

To the obtained amorphous silicotitanate gel, 0.98 g of niobium hydroxide ($Nb(OH)_5$) powder was added to obtain a raw material mixture including an amorphous silicotitanate gel of the following composition.
Si/Ti mole ratio=1.34
Na/Ti mole ratio=3.3
$H_2O$/Ti mole ratio=82
Nb/Ti mole ratio=0.35

A crystallized product was obtained by crystallizing the raw material mixture in the same manner as in Example 1 except that the aforementioned raw material mixture was used. The crystallized product was cooled, filtered, washed, and dried in the same manner as in Example 1 to obtain a niobium-containing silicotitanate composition in a powder form.

Figure 10:
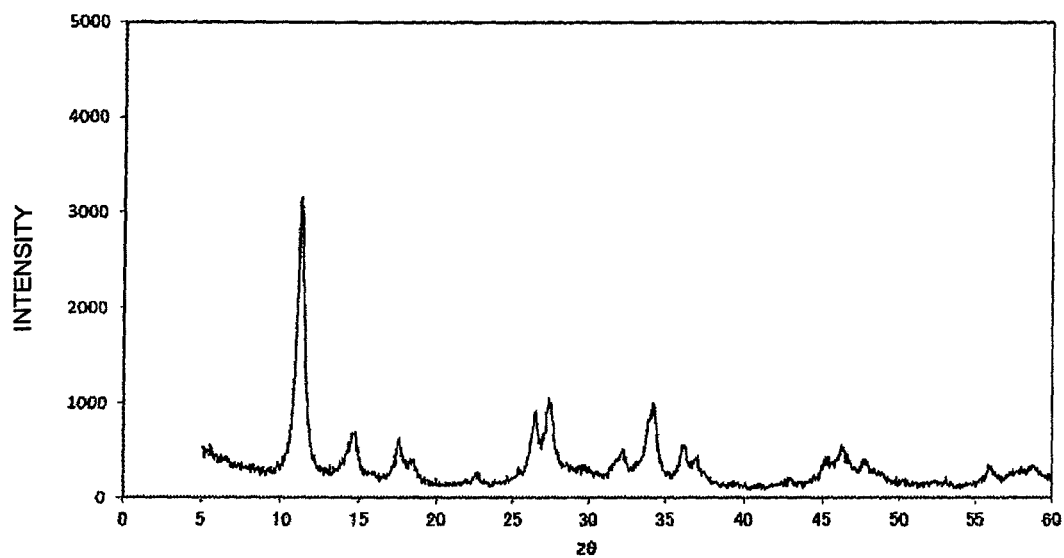
FIG. 10 is an XRD chart of a silicotitanate composition of Example 6.

From an XRD chart of the obtained niobium-containing silicotitanate composition, an XRD peak attributable to a component other than a sitinakite structure was not confirmed. The silicotitanate composition of this example was confirmed to be a single phase of S-type silicotitanate. The XRD chart of the silicotitanate composition of this example is shown in FIG. 10.

The Si/Ti mole ratio of the obtained niobium-containing silicotitanate composition was 0.73, the Na/Ti mole ratio was 1.35, and the Nb/Ti mole ratio was 0.33. Results of composition analysis of the obtained silicotitanate composition are shown in Table 9.

(Evaluation of Sr and Cs Adsorption Properties)

For the obtained silicotitanate composition, the Sr and Cs selective adsorption properties from simulated seawater were evaluated. Simulated seawater having the following composition was prepared using NaCl, $MgCl_2$, $CaCl_2$, a Sr standard solution, and a Cs standard solution.
Na: 996 ppm by weight
Mg: 118 ppm by weight
Ca: 41 ppm by weight
Sr: 1 ppm by weight
Cs: 1 ppm by weight To 1 L of the simulated seawater, 0.05 g of the silicotitanate composition was added, and the mixture was mixed with stirring at 25° C. and 800 rpm for 24 hours. Thus, the adsorption properties were evaluated.

After the evaluation of the adsorption properties, the Sr concentration in the simulated seawater was 0.63 ppm by weight, the Cs concentration was 0.008 ppm, the calcium concentration was 39.5 ppm by weight, and the magnesium concentration was 115 ppm by weight. Kd of each metal determined by the above-described equation (1) was as follows.
$Kd_{(Sr)}$: 12,000 mL/g
$Kd_{(Cs)}$: 2,400,000 mL/g
$Kd_{(Ca)}$: 5,000 mL/g
$Kd_{(Mg)}$: 5,200 mL/g The removal ratio of each metal determined by the above-described equation (2) was as follows.
Sr: 37%
Cs: 99.2%
Ca: 3.7%
Mg: 2.5%

Results of Cs and Sr adsorptivities of the silicotitanate composition of this example are shown in Table 9.

Therefore, $Kd_{(Sr)}$ was 10,000 mL/g or more, $Kd_{(Cs)}$ was 100,000 mL/g or more, and they were larger than Kd of calcium and magnesium. The Sr and Cs removal ratios were larger than calcium and magnesium removal ratios. The silicotitanate composition of this example was confirmed to have Sr and Cs adsorption selectivities in the coexistence of seawater component.

As compared with Example 2 in which the composition of simulated seawater was different but Nb was not contained, the Sr and Cs removal ratios were larger. The silicotitanate composition was confirmed to have excellent Sr and Cs adsorption selectivities in the coexistence of seawater component.

Example 7

An amorphous silicotitanate gel was obtained in the same manner as in Example 4 except that the amorphous silicotitanate gel had the following composition.
Si/Ti mole ratio=1.34
Na/Ti mole ratio=3.3
Nb/Ti mole ratio=0.2
$H_2O$/Ti mole ratio=82

The amorphous silicotitanate gel was crystallized in the same manner as in Example 1, and the crystallized product was further cooled, filtered, washed, and dried to obtain a silicotitanate composition.

Figure 11:
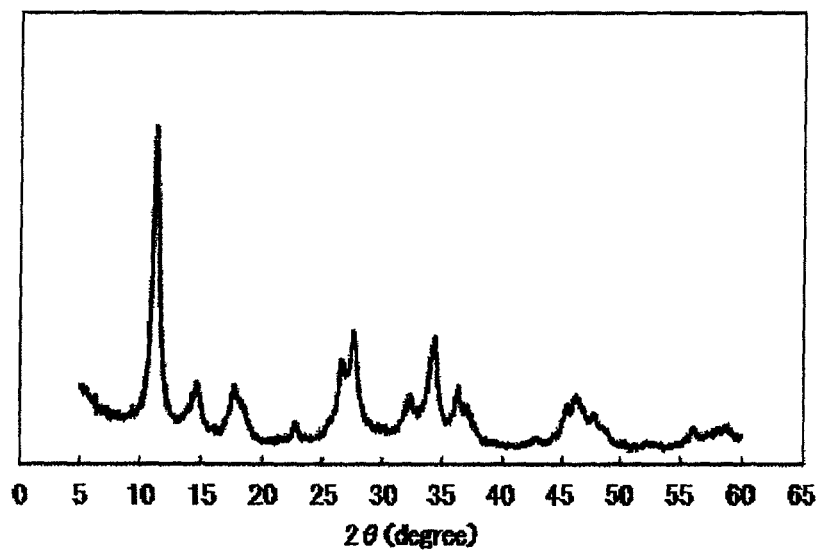
FIG. 11 is an XRD chart of a silicotitanate composition of Example 7.

From results of XRD measurement, the obtained silicotitanate composition was confirmed to have an X-ray diffraction angle and a diffraction peak intensity ratio shown in Table 7, and was confirmed to be a single phase of S-type silicotitanate composition. The XRD pattern is shown in FIG. 11. Results of composition analysis of the obtained silicotitanate composition are shown in Table 9.

TABLE 7

| DIFFRACTION ANGLE 2θ [°] | XRD PEAK INTENSITY RATIO |
|---|---|
| 11.3 | 100 |
| 27.4 | 40 |

The Sr and Cs selective adsorption properties were evaluated in the same manner as in Example 4. After the evaluation of the adsorption properties, the Sr concentration in the simulated seawater was 0.85 ppm by weight, and the Cs concentration was 0.007 ppm by weight. Kd of each metal was as follows.
$Kd_{(Cs)}$: 2,840,000 mL/g
$Kd_{(Sr)}$: 3,530 mL/g The removal ratio of each metal was as follows.
Cs: 99.3%
Sr: 15%

Results of Cs and Sr adsorptivities of the silicotitanate composition of this example are shown in Table 9.

Example 8

An amorphous silicotitanate gel was obtained in the same manner as in Example 4 except that the amorphous silicotitanate gel had the following composition.
Si/Ti mole ratio=1.34
Na/Ti mole ratio=3.3
Nb/Ti mole ratio=0.35
$H_2O$/Ti mole ratio=82

The amorphous silicotitanate gel was crystallized in the same manner as in Example 1, and the crystallized product was further cooled, filtered, washed, and dried to obtain a silicotitanate composition.

Figure 12:
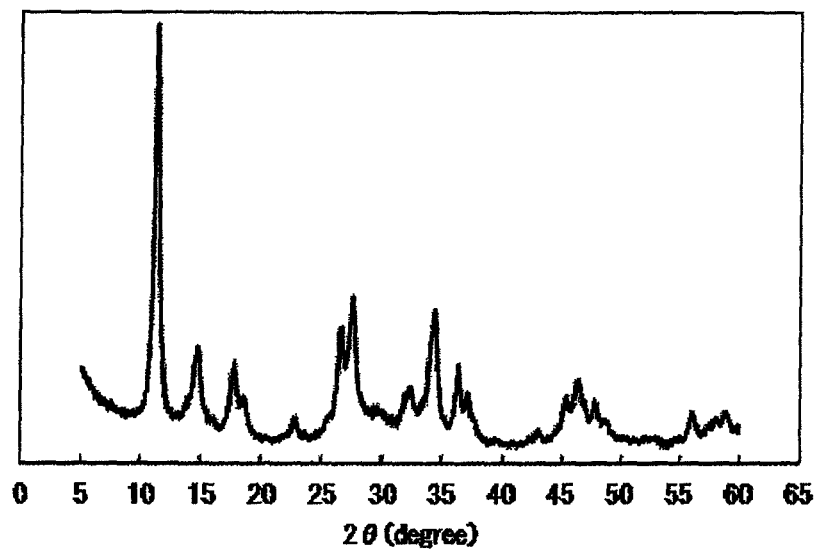
FIG. 12 is an XRD chart of a silicotitanate composition of Example 8.

From results of XRD measurement, the obtained silicotitanate composition was confirmed to have an X-ray diffraction angle and a diffraction peak intensity ratio shown in Table 8, and was confirmed to be a single phase of S-type silicotitanate composition. The XRD pattern is shown in FIG. 12. Results of composition analysis of the obtained silicotitanate composition are shown in Table 9.

TABLE 8

| DIFFRACTION ANGLE 2θ [°] | XRD PEAK INTENSITY RATIO |
|---|---|
| 11.3 | 100 |
| 27.5 | 38 |

The Sr and Cs selective adsorption properties were evaluated in the same manner as in Example 1. After the evaluation of the adsorption properties, the Sr concentration in the simulated seawater was 0.73 ppm by weight, and the Cs concentration was 0.008 ppm by weight. Kd of each metal was as follows.

$Kd_{(Cs)}$: 2,480,000 mL/g
$Kd_{(Sr)}$: 7,400 mL/g

The removal ratio of each metal was as follows.
Cs: 99.2%
Sr: 27%

Results of Cs and Sr adsorptivities of the silicotitanate composition of this example are shown in Table 9.

Comparative Example 3

9 g of tetraethyl orthosilicate and 10 g of tetraisopropyl orthotitanate were mixed, and the mixture was mixed in a mixed solution of 9 g of a sodium hydroxide solution (NaOH; 48% by weight) and 49 g of water to obtain a raw material mixture having the following composition.

Si/Ti mole ratio=1.18
Na/Ti mole ratio=0.3.8
$H_2O$/Ti mole ratio=82

The obtained raw material mixture was a silicotitanate gel. The silicotitanate gel included 6.5% by weight of ethyl alcohol and 7.6% by weight of isopropyl alcohol as byproducts. For a removal treatment of alcohols as byproducts, a nitrogen gas was blown into the silicotitanate gel from an upper portion of an autoclave. After 12 hours, to the obtained amorphous silicotitanate gel, 0.73 g of niobium oxide ($Nb_2O_5$) powder was added, to obtain a raw material mixture including an amorphous silicotitanate gel of the following composition.

Si/Ti mole ratio=1.18
Na/Ti mole ratio=3.8
$H_2O$/Ti mole ratio=82
Nb/Ti mole ratio=0.2

A crystallized product was obtained by crystallizing the raw material mixture in the same manner as in Example 1 except that the aforementioned raw material mixture was used. The pressure during crystallization was 0.8 MPa. The crystallized product was cooled, filtered, washed, and dried in the same manner as in Example 1 to obtain a niobium-containing silicotitanate composition in a powder form.

Figure 13:
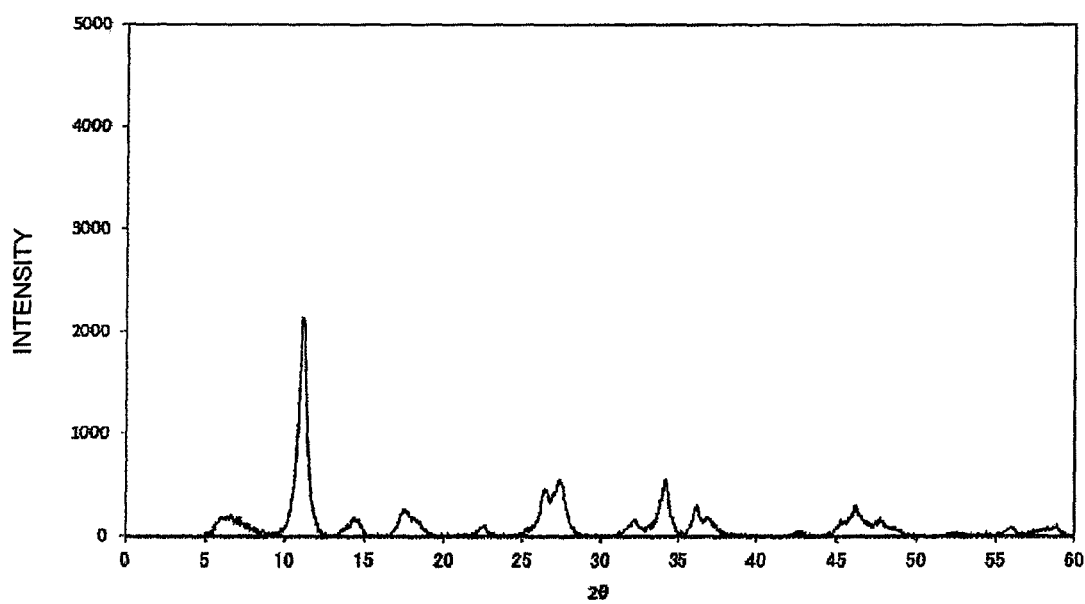
FIG. 13 is an XRD chart of a silicotitanate composition of Comparative Example 3.

From an XRD chart of the obtained niobium-containing silicotitanate composition, an XRD peak attributable to a component other than a sitinakite structure was not confirmed. Therefore, the silicotitanate composition of this comparative example was confirmed to be a single phase of S-type silicotitanate. The XRD chart of the silicotitanate composition of this comparative example is shown in FIG. 13.

The Si/Ti mole ratio of the obtained niobium-containing silicotitanate composition was 0.66, the Na/Ti mole ratio was 1.23, and the Nb/Ti mole ratio was 0.17. Results of composition analysis of the obtained silicotitanate composition are shown in Table 9.

Figure 14:
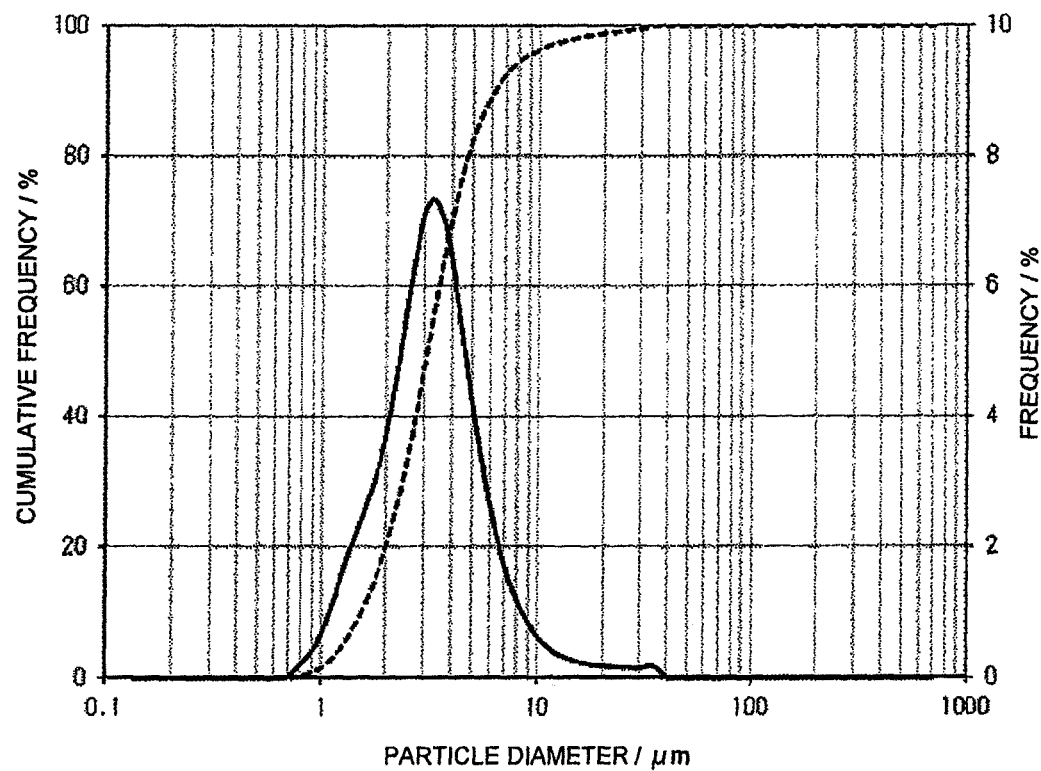
FIG. 14 shows a particle diameter distribution of the silicotitanate composition of Comparative Example 3 and a cumulative curve thereof. (solid line: frequency of particle diameter distribution, dashed line: cumulative frequency of particle diameter distribution)

FIG. 14 shows a cumulative curve of particle diameter distribution of this comparative example. The average particle diameter of the niobium-containing silicotitanate composition was 3.1 μm, and the cumulative value at which the particle diameter was 10 μm was 97%.

(Evaluation of Sr Adsorption Properties)

For the obtained silicotitanate composition, the Sr and Cs selective adsorption properties from simulated seawater were evaluated. Simulated seawater having the following composition was prepared using NaCl, $MgCl_2$, $CaCl_2$, a Sr standard solution, and a Cs standard solution.

Na: 996 ppm by weight
Mg: 118 ppm by weight
Ca: 41 ppm by weight
Sr: 1 ppm by weight
Cs: 1 ppm by weight To 1 L of the simulated seawater, 0.05 g of the silicotitanate composition was added, and the mixture was mixed with stirring at 25° C. and 800 rpm for 24 hours. Thus, the adsorption properties were evaluated.

After the evaluation of the adsorption properties, the Sr concentration in the simulated seawater was 0.85 ppm by weight, the Cs concentration was 0.34 ppm, the calcium concentration that was a seawater component was 38.0 ppm by weight, and the magnesium concentration was 110 ppm by weight. Kd of each metal determined by the above-described equation (1) was as follows.

$Kd_{(Sr)}$: 3,500 mL/g
$Kd_{(Cs)}$: 39,000 mL/g
$Kd_{(Ca)}$: 1,600 mL/g
$Kd_{(Mg)}$: 1,500 mL/g

The removal ratio of each metal determined by the above-described equation (2) was as follows.

Sr: 15%
Cs: 66%
Ca: 7.3%
Mg: 6.8%

Results of Cs and Sr adsorptivities of the silicotitanate composition of this comparative example are shown in Table 9.

$Kd_{(Sr)}$ was less than 10,000 mL/g, and $Kd_{(Cs)}$ was less than 100,000 mL/g. The silicotitanate composition of this comparative example was confirmed to have inferior Sr and Cs adsorption selectivities in the coexistence of seawater component.

As compared with Example 5 in which the composition of simulated seawater was different but Nb was contained, $Kd_{(Sr)}$ and $Kd_{(Cs)}$ were lower. This shows that the Sr and Cs adsorption selectivities in the coexistence of seawater component are inferior.

TABLE 9

| | Si/Ti MOLE RATIO | M/Ti MOLE RATIO | Nb/Ti MOLE RATIO | $Kd_{(Cs)}$ | Cs REMOVAL RATIO [%] | $Kd_{(Sr)}$ | Sr REMOVAL RATIO [%] |
|---|---|---|---|---|---|---|---|
| EXAMPLE 5 | 0.67 | 1.35 | 0.16 | 1,800,000 | 98.9 | 20,000 | 50 |
| EXAMPLE 6 | 0.73 | 1.35 | 0.33 | 2,400,000 | 99.2 | 12,000 | 37 |
| EXAMPLE 7 | 0.69 | 1.17 | 0.19 | 2,840,000 | 99.3 | 3,530 | 15 |
| EXAMPLE 8 | 0.73 | 1.35 | 0.33 | 2,480,000 | 99.2 | 7,400 | 27 |
| COMPARATIVE EXAMPLE 3 | 0.66 | 1.23 | 0.17 | 39,000 | 66.0 | 3,500 | 15 |

Example 9

20 g of sodium silicate ($SiO_2$; 29.1% by weight), 71 g of an aqueous solution of titanium oxysulfate ($TiOSO_4$; 8.2% by weight), 63 g of sodium hydroxide (NaOH; 48% by weight), and 41 g of pure water were mixed to obtain an amorphous silicotitanate gel of the following composition.

Si/Ti mole ratio=1.37
Na/Ti mole ratio=3.3
$H_2O$/Ti mole ratio=82

To the obtained amorphous silicotitanate gel, 8.0 g of niobium hydroxide ($Nb(OH)_5$) powder and a silicotitanate having a crystal of sitinakite structure as a seed crystal in an amount of 1% by weight relative to the amorphous silicotitanate gel were added. Subsequently, an amorphous silicotitanate gel including an amorphous silicotitanate gel of the following composition was obtained.

Si/Ti mole ratio=1.37
Na/Ti mole ratio=3.3
Nb/Ti mole ratio=0.4
$H_2O$/Ti mole ratio=82

The amorphous silicotitanate gel was charged in a stainless steel autoclave (trade name: KH-02, manufactured by HIRO COMPANY) with stirring. The amorphous silicotitanate gel was crystallized by heating at 180° C. for 72 hours, to obtain a crystallized product.

The pressure during crystallization was 0.8 MPa, which corresponded to a water vapor pressure at 180° C. The crystallized product was cooled, filtered, washed, and dried to obtain a silicotitanate composition.

Figure 15:
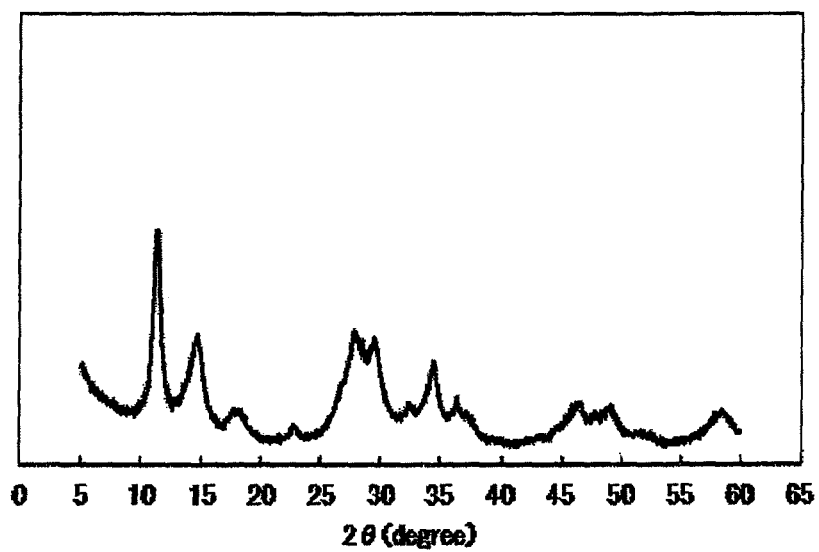
FIG. 15 is an XRD chart of a silicotitanate composition of Example 9.

From results of XRD measurement, the obtained silicotitanate composition was confirmed to have an X-ray diffraction angle and a diffraction peak intensity ratio shown in Table 10. The XRD pattern is shown in FIG. 15. The obtained XRD pattern was compared with XRD peaks described in Reference HP. As a result, the silicotitanate composition of this example was confirmed to include an S-type silicotitanate and a V-type silicotitanate. Results of composition analysis of the obtained silicotitanate composition are shown in Table 13.

TABLE 10

| DIFFRACTION ANGLE 2θ [°] | XRD PEAK INTENSITY RATIO |
|---|---|
| 11.3 | 100 |
| 27.7 | 57 |
| 29.4 | 54 |

The Cs and Sr selective adsorption properties were evaluated in the same manner as in Example 4. After the evaluation of the adsorption properties, the Cs concentration in the simulated seawater was 0.020 ppm by weight, and the Sr concentration was 0.40 ppm by weight. Kd of each metal was as follows.

$Kd_{(Cs)}$: 980,000 mL/g
$Kd_{(Sr)}$: 30,000 mL/g

The removal ratio of each metal was as follows.
Cs: 98.0%
Sr: 60%

Results of Cs and Sr adsorptivities of the silicotitanate composition of this example are shown in Table 13.

Example 10

An amorphous silicotitanate gel was prepared in the same manner as in Example 9 except that the amorphous silicotitanate gel had the following composition:

Si/Ti mole ratio=1.37
Na/Ti mole ratio=3.3
Nb/Ti mole ratio=0.5
$H_2O$/Ti mole ratio=82

The amorphous silicotitanate gel was crystallized in the same manner as in Example 1, and the crystallized product was further cooled, filtered, washed, and dried to obtain a silicotitanate composition.

Figure 16:
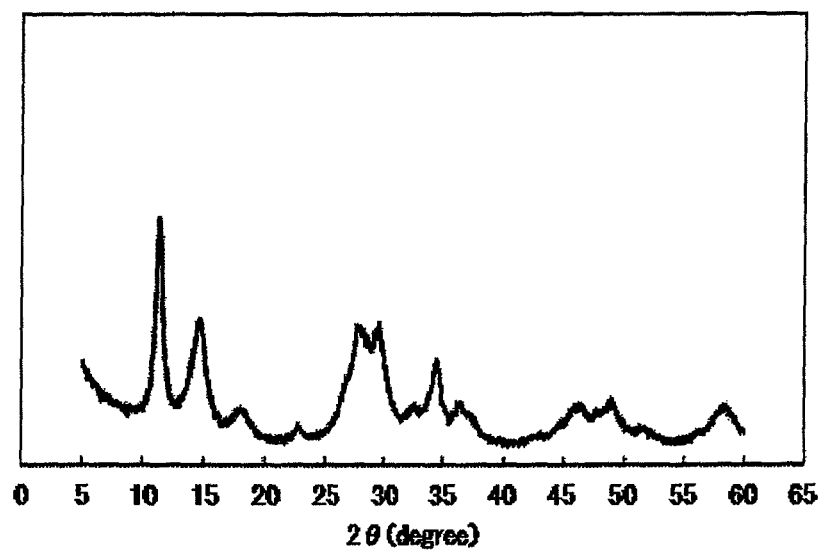
FIG. 16 is an XRD chart of a silicotitanate composition of Example 10.

From results of XRD measurement, the obtained silicotitanate composition was confirmed to have an X-ray diffraction angle and a diffraction peak intensity ratio shown in Table 11. The XRD pattern is shown in FIG. 16. The obtained XRD pattern was compared with XRD peaks described in Reference HP. As a result, the silicotitanate composition of this example was confirmed to include an S-type silicotitanate and a V-type silicotitanate. Results of composition analysis of the obtained silicotitanate composition are shown in Table 13.

TABLE 11

| DIFFRACTION ANGLE 2θ [°] | XRD PEAK INTENSITY RATIO |
|---|---|
| 11.3 | 100 |
| 27.8 | 56 |
| 29.5 | 57 |

The Sr and Cs selective adsorption properties were evaluated in the same manner as in Example 4. After the evaluation of the adsorption properties, the Cs concentration in the simulated seawater was 0.032 ppm by weight, and the Sr concentration was 0.35 ppm by weight. Kd of each metal was as follows.

$Kd_{(Cs)}$: 605,000 mL/g $Kd_{(Sr)}$: 37,300 mL/g

The removal ratio of each metal was as follows.

Cs: 96.8%

Sr: 65%

Results of Cs and Sr adsorptivities of the silicotitanate composition of this example are shown in Table 13.

Example 11

An amorphous silicotitanate gel was prepared in the same manner as in Example 9 except that the amorphous silicotitanate gel had the following composition.

Si/Ti mole ratio=1.37

Na/Ti mole ratio=3.3

Nb/Ti mole ratio=0.6

H$_2$O/Ti mole ratio=82

The amorphous silicotitanate gel was crystallized in the same manner as in Example 1, and the crystallized product was further cooled, filtered, washed, and dried to obtain a silicotitanate composition.

Figure 17:
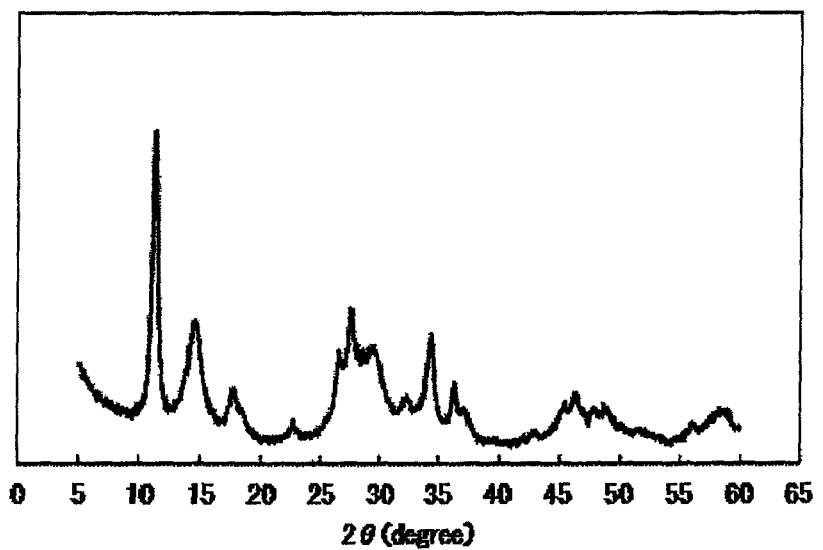
FIG. 17 is an XRD chart of a silicotitanate composition of Example 11.

From results of XRD measurement, the obtained silicotitanate composition was confirmed to have an X-ray diffraction angle and a diffraction peak intensity ratio shown in Table 12. The XRD pattern is shown in FIG. 17. The obtained XRD pattern was compared with XRD peaks described in Reference HP. As a result, the silicotitanate composition of this example was confirmed to include an S-type silicotitanate and a V-type silicotitanate. Results of composition analysis of the obtained silicotitanate composition are shown in Table 13.

TABLE 12

| DIFFRACTION ANGLE 2θ [°] | XRD PEAK INTENSITY RATIO |
|---|---|
| 11.3 | 100 |
| 27.5 | 47 |
| 29.5 | 36 |

The Cs and Sr selective adsorption properties were evaluated in the same manner as in Example 4. After the evaluation of the adsorption properties, the Cs concentration in the simulated seawater was 0.012 ppm by weight, and the Sr concentration was 0.54 ppm by weight. Kd of each metal was as follows.

$Kd_{(Cs)}$: 1,650,000 mL/g $Kd_{(Sr)}$: 16,900 mL/g

The removal ratio of each metal was as follows.

Cs: 98.8%

Sr: 56%

Results of Cs and Sr adsorptivities of the silicotitanate composition of this example are shown in Table 13.

Example 12

An amorphous silicotitanate gel was prepared in the same manner as in Example 9 except that the amorphous silicotitanate gel had the following composition.

Si/Ti mole ratio=1.37

Na/Ti mole ratio=3.3

Nb/Ti mole ratio=0.8

H$_2$O/Ti mole ratio=82

The amorphous silicotitanate gel was charged in a stainless steel autoclave (trade name: KH-02, manufactured by HIRO COMPANY) with stirring. The amorphous silicotitanate gel was crystallized by heating at 180° C. for 72 hours, to obtain a crystallized product.

The pressure during crystallization was 0.8 MPa, which corresponded to a water vapor pressure at 180° C. The crystallized product was cooled, filtered, washed, and dried to obtain a silicotitanate composition.

Figure 18:
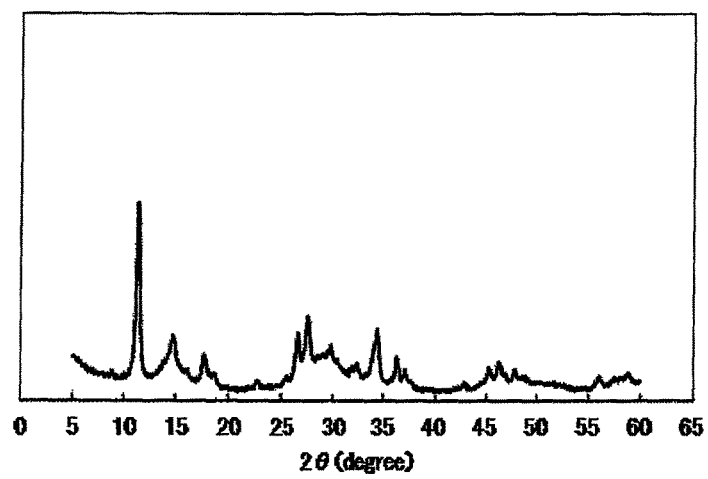
FIG. 18 is an XRD chart of a silicotitanate composition of Example 12.

From results of XRD measurement, the obtained silicotitanate composition was confirmed to have an X-ray diffraction angle and a diffraction peak intensity ratio shown in Table 14. The XRD pattern is shown in FIG. 18. From the obtained XRD pattern, the crystallized product of this example was confirmed to include an S-type silicotitanate and a niobate. Results of composition analysis of the obtained silicotitanate composition are shown in Table 20.

TABLE 14

| DIFFRACTION ANGLE 2θ [°] | XRD PEAK INTENSITY RATIO |
|---|---|
| 8.8 | 15 |
| 10.0 | 14 |
| 11.3 | 100 |
| 29.7 | 28 |

The Cs and Sr selective adsorption properties were evaluated in the same manner as in Example 4. After the evaluation of the adsorption properties, the Cs concentration in the simulated seawater was 0.017 ppm by weight, and the Sr concentration was 0.53 ppm by weight. Kd of each metal was as follows.

$Kd_{(Cs)}$: 1,160,000 mL/g $Kd_{(Sr)}$: 17,700 mL/g

The removal ratio of each metal was as follows.

Cs: 98.3%

Sr: 47%

Results of Cs and Sr adsorptivities of the silicotitanate composition of this example are shown in Table 22.

TABLE 13

|  | Si/Ti MOLE RATIO | M/Ti MOLE RATIO | Nb/Ti MOLE RATIO | $Kd_{(Cs)}$ | Cs REMOVAL RATIO [%] | $Kd_{(Sr)}$ | Sr REMOVAL RATIO [%] |
|---|---|---|---|---|---|---|---|
| EXAMPLE 9 | 0.79 | 1.40 | 0.37 | 980,000 | 98.0 | 30,000 | 60 |
| EXAMPLE 10 | 0.82 | 1.49 | 0.46 | 605,000 | 96.8 | 37,300 | 65 |
| EXAMPLE 11 | 0.86 | 1.62 | 0.56 | 1,650,000 | 98.8 | 16,900 | 56 |

Example 13

An amorphous silicotitanate gel was prepared in the same manner as in Example 9 except that the amorphous silicotitanate gel had the following composition.

Si/Ti mole ratio=1.37
Na/Ti mole ratio=3.3
Nb/Ti mole ratio=1.0
$H_2O$/Ti mole ratio=82

The amorphous silicotitanate gel was crystallized in the same manner as in Example 1, and the crystallized product was further cooled, filtered, washed, and dried to obtain a silicotitanate composition.

Figure 19:
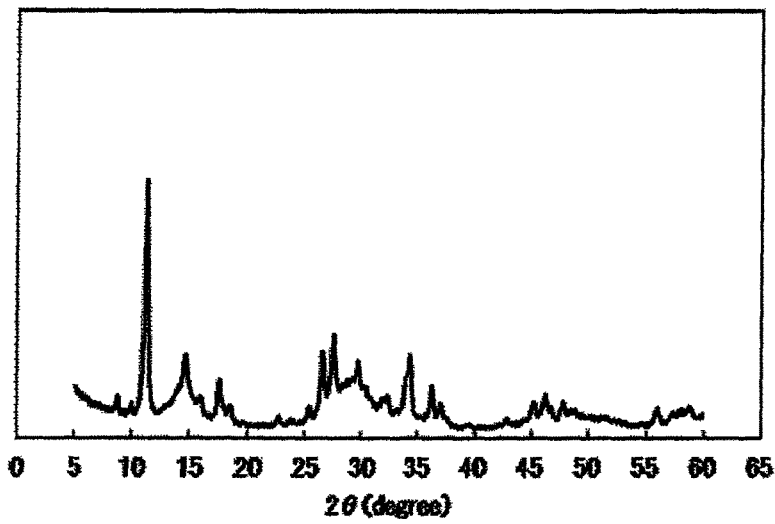
FIG. 19 is an XRD chart of a silicotitanate composition of Example 13.

From results of XRD measurement, the obtained silicotitanate composition was confirmed to have an X-ray diffraction angle and a diffraction peak intensity ratio shown in Table 15. The XRD pattern is shown in FIG. 19. From the obtained XRD pattern, the crystallized product of this example was confirmed to include an S-type silicotitanate and a niobate. Results of composition analysis of the obtained silicotitanate composition are shown in Table 22.

TABLE 15

| DIFFRACTION ANGLE 2θ [°] | XRD PEAK INTENSITY RATIO |
| --- | --- |
| 8.8 | 17 |
| 10.0 | 14 |
| 11.3 | 100 |
| 29.7 | 30 |

The Cs and Sr selective adsorption properties were evaluated in the same manner as in Example 4. After the evaluation of the adsorption properties, the Cs concentration in the simulated seawater was 0.021 ppm by weight, and the Sr concentration was 0.44 ppm by weight. Kd of each metal was as follows.

$Kd_{(Cs)}$: 932,000 mL/g
$Kd_{(Sr)}$: 25,500 mL/g

The removal ratio of each metal was as follows.
Cs: 97.9%
Sr: 56%

Results of Cs and Sr adsorptivities of the silicotitanate composition of this example are shown in Table 22.

Example 14

An amorphous silicotitanate gel was prepared in the same manner as in Example 9 except that the amorphous silicotitanate gel had the following composition.

Si/Ti mole ratio=1.34
Na/Ti mole ratio=3.3
Nb/Ti mole ratio=0.4
$H_2O$/Ti mole ratio=123

The amorphous silicotitanate gel was crystallized in the same manner as in Example 1, and the crystallized product was further cooled, filtered, washed, and dried to obtain a silicotitanate composition.

Figure 20:
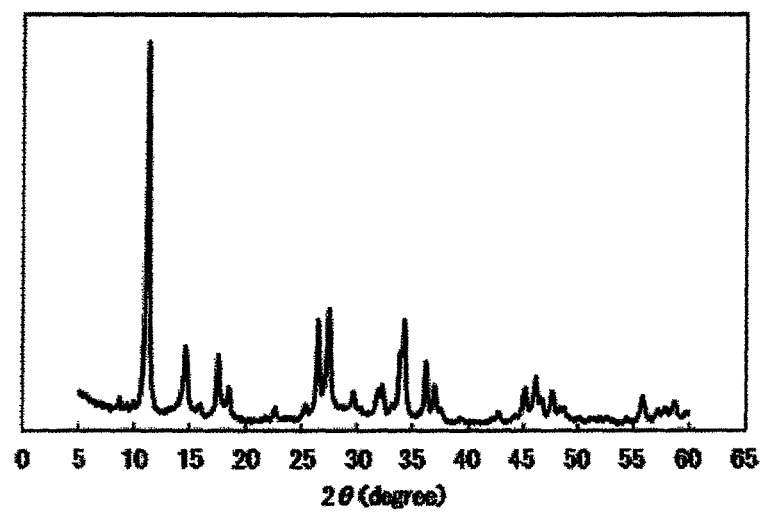
FIG. 20 is an XRD chart of a silicotitanate composition of Example 14.

From results of XRD measurement, the obtained silicotitanate composition was confirmed to have an X-ray diffraction angle and a diffraction peak intensity ratio shown in Table 16. The XRD pattern is shown in FIG. 20. From the obtained XRD pattern, the crystallized product of this example was confirmed to include an S-type silicotitanate and a niobate. Results of composition analysis of the obtained silicotitanate composition are shown in Table 22.

TABLE 16

| DIFFRACTION ANGLE 2θ [°] | XRD PEAK INTENSITY RATIO |
| --- | --- |
| 8.7 | 9 |
| 9.9 | 8 |
| 11.2 | 100 |
| 29.6 | 10 |

The Cs and Sr selective adsorption properties were evaluated in the same manner as in Example 4. After the evaluation of the adsorption properties, the Cs concentration in the simulated seawater was 0.0038 ppm by weight, and the Sr concentration was 0.71 ppm by weight. Kd of each metal was as follows.

$Kd_{(Cs)}$: 5,240,000 mL/g
$Kd_{(Sr)}$: 8,250 mL/g

The removal ratio of each metal was as follows.
Cs: 99.62%
Sr: 29%

Results of Cs and Sr adsorptivities of the silicotitanate composition of this example are shown in Table 22.

Example 15

An amorphous silicotitanate gel was prepared in the same manner as in Example 9 except that the amorphous silicotitanate gel had the following composition.

Si/Ti mole ratio=1.34
Na/Ti mole ratio=3.3
Nb/Ti mole ratio=0.5
$H_2O$/Ti mole ratio=114

The amorphous silicotitanate gel was charged in a stainless steel autoclave (trade name: KH-02, manufactured by HIRO COMPANY) with stirring. The amorphous silicotitanate gel was crystallized by heating at 180° C. for 72 hours, to obtain a crystallized product.

The pressure during crystallization was 0.8 MPa, which corresponded to a water vapor pressure at 180° C. The crystallized product was cooled, filtered, washed, and dried to obtain a silicotitanate composition.

Figure 21:
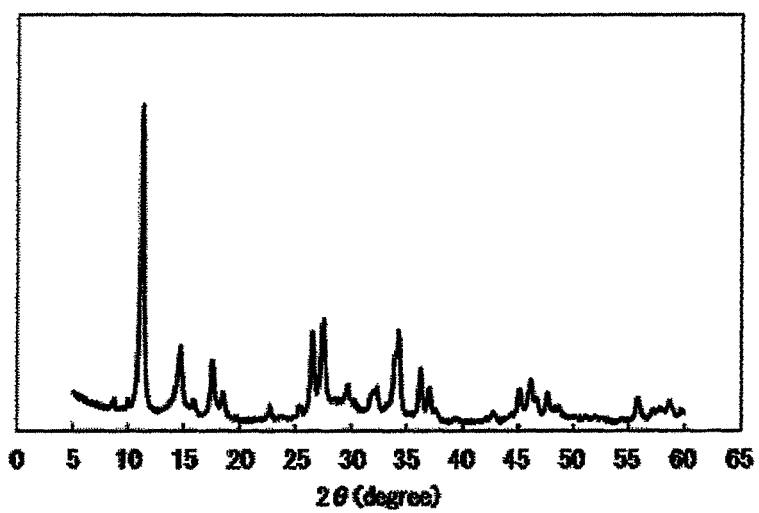
FIG. 21 is an XRD chart of a silicotitanate composition of Example 15.

From results of XRD measurement, the obtained silicotitanate composition was confirmed to have an X-ray diffraction angle and a diffraction peak intensity ratio shown in Table 17. The XRD pattern is shown in FIG. 21. From the obtained XRD pattern, the crystallized product of this example was confirmed to include an S-type silicotitanate and a niobate. Results of composition analysis of the obtained silicotitanate composition are shown in Table 22.

TABLE 17

| DIFFRACTION ANGLE 2θ [°] | XRD PEAK INTENSITY RATIO |
| --- | --- |
| 8.8 | 10 |
| 10.0 | 10 |
| 11.2 | 100 |
| 29.6 | 14 |

The Cs and Sr selective adsorption properties were evaluated in the same manner as in Example 4. After the evaluation of the adsorption properties, the Cs concentration in the simulated seawater was 0.0037 ppm by weight, and the Sr concentration was 0.67 ppm by weight. Kd of each metal was as follows.

$Kd_{(Cs)}$: 5,390,000 mL/g
$Kd_{(Sr)}$: 10,100 mL/g

The removal ratio of each metal was as follows.

Cs: 99.63%
Sr: 33%

Results of Cs and Sr adsorptivities of the silicotitanate composition of this example are shown in Table 22.

Example 16

An amorphous silicotitanate gel was prepared in the same manner as in Example 9 except that the amorphous silicotitanate gel had the following composition.

Si/Ti mole ratio=1.34
Na/Ti mole ratio=3.3
Nb/Ti mole ratio=0.6
$H_2O$/Ti mole ratio=123

The amorphous silicotitanate gel was crystallized in the same manner as in Example 1, and the crystallized product was further cooled, filtered, washed, and dried to obtain a silicotitanate composition.

Figure 22:
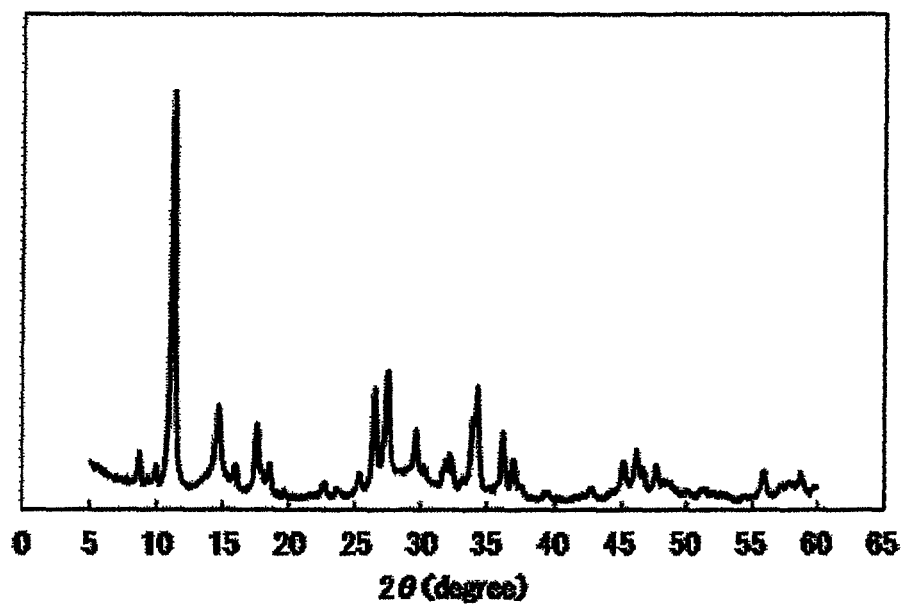
FIG. 22 is an XRD chart of a silicotitanate composition of Example 16.

From results of XRD measurement, the obtained silicotitanate composition was confirmed to have an X-ray diffraction angle and a diffraction peak intensity ratio shown in Table 18. The XRD pattern is shown in FIG. 22. From the obtained XRD pattern, the crystallized product of this example was confirmed to include an S-type silicotitanate and a niobate. Results of composition analysis of the obtained silicotitanate composition are shown in Table 22.

TABLE 18

| DIFFRACTION ANGLE 2θ [°] | XRD PEAK INTENSITY RATIO |
|---|---|
| 8.8 | 14 |
| 10.0 | 11 |
| 11.2 | 100 |
| 29.6 | 20 |

The Cs and Sr selective adsorption properties were evaluated in the same manner as in Example 4. After the evaluation of the absorption properties, the Cs concentration in the simulated seawater was 0.0044 ppm by weight, and the Sr concentration was 0.64 ppm by weight. Kd of each metal was as follows.

$Kd_{(Cs)}$: 4,530,000 mL/g
$Kd_{(Sr)}$: 11,300 mL/g

The removal ratio of each metal was as follows.

Cs: 99.56%
Sr: 36%

Results of Cs and Sr adsorptivities of the silicotitanate composition of this example are shown in Table 22.

Example 17

An amorphous silicotitanate gel was prepared in the same manner as in Example 9 except that the amorphous silicotitanate gel had the following composition.

Si/Ti mole ratio=1.34
Na/Ti mole ratio=3.3
Nb/Ti mole ratio=0.6
$H_2O$/Ti mole ratio=109

The amorphous silicotitanate gel was crystallized in the same manner as in Example 1, and the crystallized product was further cooled, filtered, washed, and dried to obtain a silicotitanate composition.

Figure 23:
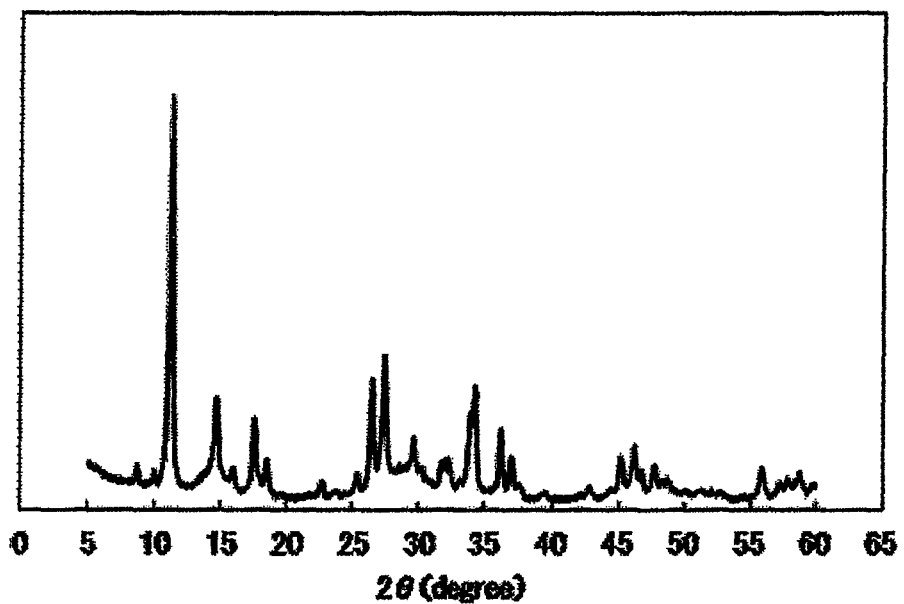
FIG. 23 is an XRD chart of a silicotitanate composition of Example 17.

From results of XRD measurement, the obtained silicotitanate composition was confirmed to have an X-ray diffraction angle and a diffraction peak intensity ratio shown in Table 19. The XRD pattern is shown in FIG. 23. From the obtained XRD pattern, the crystallized product of this example was confirmed to include an S-type silicotitanate and a niobate. Results of composition analysis of the obtained silicotitanate composition are shown in Table 22.

TABLE 19

| DIFFRACTION ANGLE 2θ [°] | XRD PEAK INTENSITY RATIO |
|---|---|
| 8.7 | 11 |
| 10.0 | 10 |
| 11.2 | 100 |
| 29.6 | 18 |

The Cs and Sr selective adsorption properties were evaluated in the same manner as in Example 4. After the evaluation of the adsorption properties, the Cs concentration in the simulated seawater was 0.0029 ppm by weight, and the Sr concentration was 0.62 ppm by weight. Kd of each metal was as follows.

$Kd_{(Cs)}$: 6,880,000 mL/g
$Kd_{(Sr)}$: 12,300 mL/g

The removal ratio of each metal was as follows.

Cs: 99.71%
Sr: 38%

Results of Cs and Sr adsorptivities of the silicotitanate composition of this example are shown in Table 22.

Example 18

An amorphous silicotitanate gel was prepared in the same manner as in Example 9 except that the amorphous silicotitanate gel had the following composition.

Si/Ti mole ratio=1.34
Na/Ti mole ratio=3.3
Nb/Ti mole ratio=0.5
$H_2O$/Ti mole ratio=109

The amorphous silicotitanate gel was crystallized in the same manner as in Example 1 except that the crystallization time was changed to 24 hours, and the crystallized product was further cooled, filtered, washed, and dried to obtain a silicotitanate composition.

Figure 24:
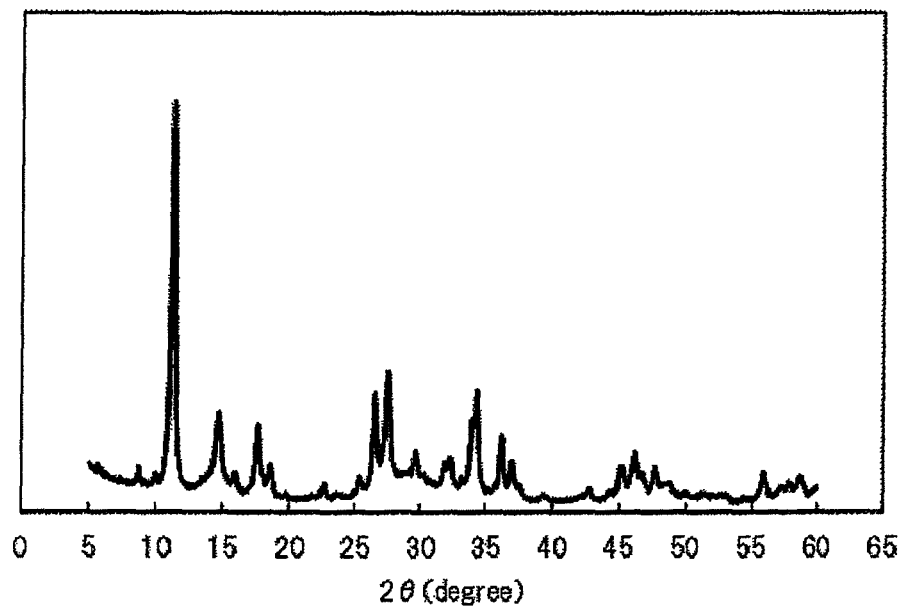
FIG. 24 is an XRD chart of a silicotitanate composition of Example 18.

From results of XRD measurement, the obtained silicotitanate composition was confirmed to have an X-ray diffraction angle and a diffraction peak intensity ratio shown in Table 20. The XRD pattern is shown in FIG. 24. From the obtained XRD pattern, the crystallized product of this example was confirmed to include an S-type silicotitanate and a niobate. Results of composition analysis of the obtained silicotitanate composition are shown in Table 22.

TABLE 20

| DIFFRACTION ANGLE 2θ [°] | XRD PEAK INTENSITY RATIO |
|---|---|
| 8.8 | 9 |
| 10.0 | 8 |
| 11.3 | 100 |
| 29.7 | 11 |

The Sr selective adsorption properties were evaluated in the same manner as in Example 4. After the evaluation of the adsorption properties, the Sr concentration in the simulated seawater was 0.70 ppm by weight. $Kd_{(Sr)}$ was as follows.

$Kd_{(Sr)}$: 9,700 mL/g

The removal ratio of each metal was as follows.

Sr: 30%

Results of Sr adsorptivity of the silicotitanate composition of this example are shown in Table 22.

Example 19

An amorphous silicotitanate gel was prepared in the same manner as in Example 9 except that the amorphous silicotitanate gel had the following composition and a seed crystal was not added to the gel.

Si/Ti mole ratio=1.34
Na/Ti mole ratio=3.3
Nb/Ti mole ratio=0.5
$H_2O$/Ti mole ratio=109

The amorphous silicotitanate gel was crystallized in the same manner as in Example 1 except that the crystallization time was changed to 24 hours, and the crystallized product was further cooled, filtered, washed, and dried to obtain a silicotitanate composition.

Figure 25:
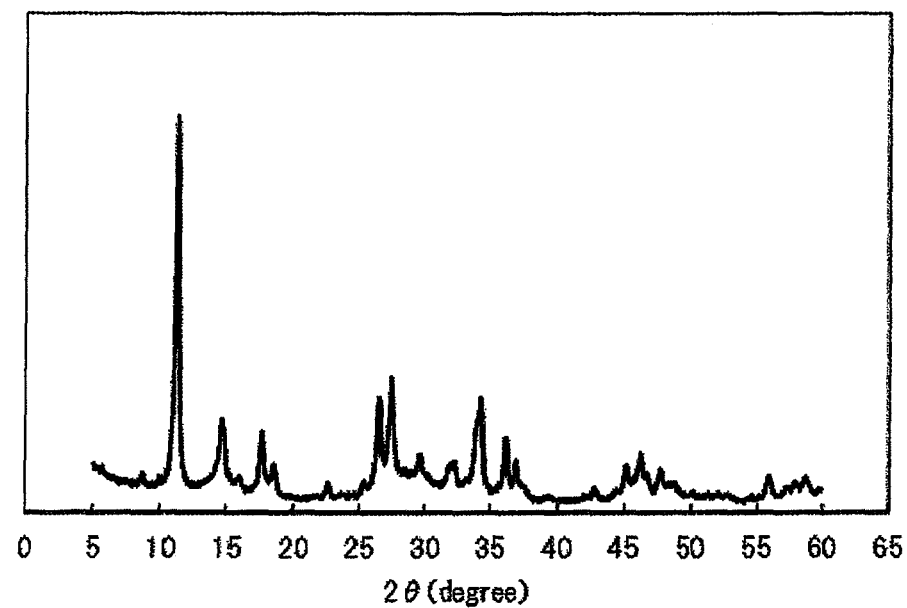
FIG. 25 is an XRD chart of a silicotitanate composition of Example 19.

From results of XRD measurement, the obtained silicotitanate composition was confirmed to have an X-ray diffraction angle and a diffraction peak intensity ratio shown in Table 21. The XRD pattern is shown in FIG. 25. From the obtained XRD pattern, the crystallized product of this example was confirmed to include an S-type silicotitanate and a niobate. Results of composition analysis of the obtained silicotitanate composition are shown in Table 22.

TABLE 21

| DIFFRACTION ANGLE 2θ [°] | XRD PEAK INTENSITY RATIO |
| --- | --- |
| 8.8 | 10 |
| 10.0 | 10 |
| 11.2 | 100 |
| 29.6 | 15 |

The Sr selective adsorption properties were evaluated in the same manner as in Example 4. After the evaluation of the adsorption properties, the Sr concentration in the simulated seawater was 0.67 ppm by weight. $Kd_{(Sr)}$ was as follows.

$Kd_{(Sr)}$: 9,850 mL/g

The Sr removal ratio was as follows.

Sr: 33%

Results of Sr adsorptivity of the silicotitanate composition of this example are shown in Table 22.

The present invention has been described in detail with reference to specific embodiments. It will be apparent to one skilled in the art that various changes and modifications can be made thereto without departing from the spirit and scope of the present invention.

The entire disclosures of JP2014-147677 filed on Jul. 18, 2014, JP2015-039326 filed on Feb. 27, 2015, JP2015-096690 filed on May 11, 2015, and JP2015-096691 filed on May 11, 2015 including specifications, claims, drawings, and abstracts are incorporated herein in its entirety by reference.

INDUSTRIAL APPLICABILITY

The present invention provides a production method for a composition including a silicotitanate having a sitinakite structure that can achieve safety production using an inexpensive raw material and can use a general-purpose autoclave. The obtained silicotitanate composition allows harmful ions such as Cs and Sr in the coexistent of seawater, groundwater, and contaminated water to be efficiently treated.

The invention claimed is:

1. An adsorption method for at least one of cesium and strontium, comprising contacting a medium containing at least one of cesium and strontium with a silicotitanate composition,
wherein the silicotitanate composition comprises a silicotitanate having a sitinakite structure and niobium, and has at least two or more diffraction peaks at X-ray diffraction (XRD) angles selected from the group consisting of 2θ=8.8±0.5°, 2θ=10.0±0.5°, and 2θ=29.6±0.5°,
wherein the silicotitanate composition has at least X-ray diffraction angles 2θ and X-ray diffraction peak intensity ratios that are shown in the following Table:

TABLE 1

| X-RAY DIFFRACTION ANGLE 2θ [°] | XRD PEAK INTENSITY RATIO |
| --- | --- |
| 8.8 ± 0.5 | 5 OR MORE AND 20 OR LESS |
| 10.0 ± 0.5 | 5 OR MORE AND 20 OR LESS |
| 11.3 ± 0.5 | 100 |
| 29.6 ± 0.5 | 5 OR MORE AND 40 OR LESS | and
wherein the medium containing at least one of cesium and strontium is at least one of soil, waste materials, seawater, or groundwater.

TABLE 22

| | Si/Ti MOLE RATIO | M/Ti MOLE RATIO | Nb/Ti MOLE RATIO | $Kd_{(Cs)}$ | Cs REMOVAL RATIO [%] | $Kd_{(Sr)}$ | Sr REMOVAL RATIO [%] |
| --- | --- | --- | --- | --- | --- | --- | --- |
| EXAMPLE 12 | 0.98 | 1.86 | 0.75 | 1,160,000 | 98.3 | 17,700 | 47 |
| EXAMPLE 13 | 1.50 | 2.06 | 1.05 | 932,000 | 97.9 | 25,500 | 56 |
| EXAMPLE 14 | 0.70 | 1.19 | 0.39 | 5,240,000 | 99.62 | 8,250 | 29 |
| EXAMPLE 15 | 0.74 | 1.38 | 0.48 | 5,390,000 | 99.63 | 10,100 | 33 |
| EXAMPLE 16 | 0.75 | 1.33 | 0.56 | 4,530,000 | 99.56 | 11,300 | 36 |
| EXAMPLE 17 | 0.74 | 1.27 | 0.57 | 6,880,000 | 99.71 | 12,300 | 38 |
| EXAMPLE 18 | 0.70 | 1.19 | 0.48 | NOT MEASURED | NOT MEASURED | 9,700 | 30 |
| EXAMPLE 19 | 0.96 | 1.65 | 0.46 | NOT MEASURED | NOT MEASURED | 9,850 | 33 |

2. The adsorption method according to claim 1, wherein the silicotitanate composition comprises a crystalline substance having at least two or more diffraction peaks at X-ray diffraction angles selected from the group consisting of $2\theta=8.8\pm0.5°$, $2\theta=10.0\pm0.5°$ and $2\theta=29.6\pm0.5°$.

3. The adsorption method according to claim 2, wherein the crystalline substance is a niobate.

4. An adsorption method for at least one of cesium and strontium, comprising contacting a medium containing at least one of cesium and strontium with a silicotitanate composition, wherein the silicotitanate composition comprises a silicotitanate having a sitinakite structure and niobium, and has at least diffraction peaks at X-ray diffraction (XRD) angles of $2\theta=27.8\pm0.5°$ and $2\theta=29.4\pm0.5°$, wherein the silicotitanate composition has at least X-ray diffraction angles $2\theta$ and X-ray diffraction peak intensity ratios that are shown in the following table:

TABLE 2

| X-RAY DIFFRACTION ANGLE $2\theta$ [°] | XRD PEAK INTENSITY RATIO |
|---|---|
| 11.3 ± 0.5 | 100 |
| 27.8 ± 0.5 | 30 OR MORE AND 70 OR LESS |
| 29.4 ± 0.5 | 30 OR MORE AND 70 OR LESS | and wherein the medium containing at least one of cesium and strontium is at least one of soil, waste materials, seawater, or groundwater.

5. The adsorption method according to claim 4, wherein the silicotitanate composition comprises a crystalline substance having at least diffraction peaks at X-ray diffraction angles of $2\theta=27.8\pm0.5°$ and $2\theta=29.4\pm0.5°$.

6. The adsorption method according to claim 5, wherein the crystalline substance is a silicotitanate having a vinogradovite structure.

* * * * *